United States Patent
Tomoyasu

(10) Patent No.: US 7,047,095 B2
(45) Date of Patent: May 16, 2006

(54) PROCESS CONTROL SYSTEM AND PROCESS CONTROL METHOD

(75) Inventor: Masayuki Tomoyasu, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 242 days.

(21) Appl. No.: 10/727,544

(22) Filed: Dec. 5, 2003

(65) Prior Publication Data

US 2004/0138773 A1 Jul. 15, 2004

(30) Foreign Application Priority Data

Dec. 6, 2002 (JP) .............................. 2002-354763

(51) Int. Cl.
*G06F 19/00* (2006.01)

(52) U.S. Cl. ...................... 700/108; 702/182

(58) Field of Classification Search ........ 700/108–110, 700/112, 113; 702/182–185
See application file for complete search history.

(56) References Cited

U.S. PATENT DOCUMENTS

| | | | |
|---|---|---|---|
| 6,016,562 A * | 1/2000 | Miyazaki et al. ............ | 714/724 |
| 6,629,009 B1 * | 9/2003 | Tamaki ........................ | 700/108 |
| 6,721,616 B1 * | 4/2004 | Ryskoski ..................... | 700/108 |
| 6,732,006 B1 * | 5/2004 | Haanstra et al. ............. | 700/121 |
| 6,766,208 B1 * | 7/2004 | Hsieh .......................... | 700/109 |
| 2003/0139838 A1 * | 7/2003 | Marella ....................... | 700/110 |

FOREIGN PATENT DOCUMENTS

| | | |
|---|---|---|
| JP | 9-22306 | 1/1997 |
| JP | 10-12694 | 1/1998 |

OTHER PUBLICATIONS

Höskuldsson, Agnar, "PLS Regression Methods," *Journal of Chemometrics*, vol. 2 (1988), pp.: 211–228.
Geladi, P., et al., "Linearization and Scatter-Correction for Near-Infrared Reflectance Spectra of Meat," *Society for Applied Spectroscopy*, vol. 39:3 (1985), pp.: 491–500.

* cited by examiner

*Primary Examiner*—Zoila Cabrera
(74) *Attorney, Agent, or Firm*—Finnegan, Henderson, Farabow, Garrett & Dunner LLP

(57) ABSTRACT

A process control system that controls processing executed on semiconductor wafers by processing apparatuses 120, 122, 124 installed in each bay (area) 110 inside a factory the processing results of which are predictable, having installed in the corresponding bay, at least one measuring apparatus 130 that executes a measuring operation on workpieces undergoing the processing in the bay, a transfer path 140 of a transfer apparatus, through which the workpieces are transferred among various apparatuses installed within the bay including the individual processing apparatuses and the measuring apparatus and a process control device 150 that controls the processing apparatuses, the measuring apparatus and the transfer apparatus in the bay. This structure reduces the length of time (cycle time) to elapse from the processing through the inspection operation and also improves the operating rate of each processing apparatus.

19 Claims, 11 Drawing Sheets

PROCESS CONTROL SYSTEM AND PROCESS CONTROL METHOD

BACKGROUND OF THE INVENTION

The present invention relates to a process control system and a process control method that may be adopted to implement control on processes through which semiconductor devices, for instance, are manufactured.

In a semiconductor manufacturing factory, for instance, a plurality of process units are installed for semiconductor production. Each process unit includes a transfer apparatus that transfers workpieces such as semiconductor wafers (hereafter to be referred to simply as "wafers") to a plurality of processing apparatuses such as etching apparatuses. In such a process unit, wafer processing is executed in a specific sequence while transferring the wafers to the individual processing apparatuses. Test wafers are normally used to regularly check the quality of process result in the etching apparatuses or the like. These test wafers undergo the processing mentioned above and then the etching rate, across wafer uniformity and the like of the test wafers having undergone the processing are inspected by employing inspection device. A judgment is made as to whether or not the processing should be continuously executed based upon the inspection results.

The inspection devices are usually installed in a separate room from the room where the process units are installed. In addition, while there are various types of inspection devices, some test wafers may not always undergo all types of inspection. However, the utilization schedules of these inspection devices are not well organized, resulting in some test wafers being left in an inspection wait state for a considerable length of time. In addition, when test wafers are used to check the states of the processing apparatuses in correspondence to individual processing steps, the test wafers cannot be transferred to the processing apparatus which executes a different processing step until the inspection for the current processing step is completed. Thus, it takes a considerable length of time to process the test wafers, leading to lower operating rates of the processing apparatuses. It is to be noted that examples of the related art in which the inspection devices are installed together in a room separate from the room where the process units are installed include the technology disclosed in Japanese Patent Laid-open Publication No. 9-22306.

In another example of the related art, which is disclosed in Japanese Patent Laid-open Publication No. 10-12694, an inspection transfer path is set up for test wafers in addition to a production transfer path on which production wafers used to manufacture regular products are transferred, so as to transfer the test wafers through the inspection transfer path when conducting inspections. In this case, a greater area in the clean room needs to be allocated for the installation of the two separate transfer paths, one for the production wafers and the other for the test wafers, and the wafers cannot be transferred quickly.

SUMMARY OF THE INVENTION

An object of the present invention is to provide a process control system and a process control method that improve the operating rates of individual processing apparatus while reducing the length of time (the cycle time) to elapse from the processing through the inspections.

In order to achieve the object described above, a first aspect of the present invention provides a process control system for controlling processing executed on workpieces by, at least, one processing apparatus installed in each area in a factory, the processing results of which are predictable, comprising at least one measuring apparatus that is installed for the corresponding area and executes a measuring operation on workpieces processed in the area, a transfer apparatus provided for the corresponding area to transfer the workpieces among apparatuses which include the processing apparatus and the measuring apparatus in the area and a control device installed for the corresponding area to control the processing apparatus, the measuring apparatus and the transfer apparatus in the area.

In order to achieve the object described above, a second aspect of the present invention provides a method of process control executed by a control device installed in each area in a process control system having installed in each area at least one processing apparatus, the processing results of which are predictable, at least one measuring apparatus that executes a measuring operation on workpieces processed by the processing apparatus, a transfer apparatus that transfers the workpieces among apparatuses which include the processing apparatus and the measuring apparatus and the control device that controls the processing apparatus, the measuring apparatus and the transfer apparatus, comprising a step in which the measuring apparatus executes a measuring operation on a workpiece processed by the processing apparatus and a step in which processing conditions are set for the processing apparatus based upon the results of the measuring operation executed by the measuring apparatus.

By adopting the system achieved in the first aspect or the method achieved in the second aspect, a necessary measuring operation can be executed by the measuring apparatus installed in each area (may also be referred to as a "bay") of a clean room or the like in a factory when the need arises in the area. As a result, workpieces are not left in a measurement wait state to wait in standby for the measuring operation executed by the measuring apparatus or left in a transfer wait state. In addition, the length of time to elapse between the processing and the measuring operation can be reduced. Thus, the operating rate of the processing apparatus can be improved. Furthermore, since only a measuring instrument that is required to enable the process control in a given area needs to be installed at the measuring apparatus, the equipment investment cost can be lowered.

In addition, the control device in the system achieved in the first aspect or the method achieved in the second aspect may set the processing conditions for the processing apparatus based upon the results of a measuring operation executed by the measuring apparatus on a workpiece processed by the processing apparatus so that the workpiece that is processed by the processing apparatus as a finished product is transferred to the measuring apparatus which then automatically measures the quality of the processed workpiece indicated by the line width of the pattern formed on the workpiece, the film thickness, the dose, the film density and the extent of stress and also indicated by the distribution within each wafer to inspect the workpiece to ascertain whether or not it has been processed within target specification ranges. In this case, the length of time to elapse after the processing until the measuring operation is executed, too, can be reduced.

In the system achieved in the first aspect or in the method achieved in the second aspect, the control device may engage the transfer apparatus to transfer the workpieces at least having undergone the processing executed by the processing apparatus to the measuring apparatus, compare a measurement value indicating the results of the processing having been executed on a workpiece which is obtained through the measuring operation executed by the measuring apparatus on the workpieces at least having undergone the processing, with a target value for the processing results, and reset the processing conditions for the processing apparatus in correspondence to an error in the measurement value relative to the target value if the error is judged to be equal to or greater than a specific value. It is to be noted that the measuring operation may be executed on the workpiece before and after undergoing the processing, instead of executing the measuring operation only on the workpiece having undergone the processing.

The workpiece at least having undergone the processing executed by the processing apparatus may be transferred by the transfer apparatus to the measuring apparatus which then executes a measuring operation on the workpiece at least having undergone the processing. The control device may compare a measurement value indicating the results of the processing having been executed on the workpiece obtained based upon the results of the measuring operation by the measuring apparatus with a target value for the processing results, observe the state of the fluctuation of an error in the measurement value relative to the target value so as to predict the tendency of the fluctuation and adjust the processing conditions for the processing apparatus in correspondence to the tendency of the fluctuation error before the error exceeds a predetermined value. It is to be noted that in this case, too, the measuring operation may be executed on the workpiece before and after the processing instead of executing the measuring operation only on the workpiece having undergone the processing.

By implementing the control described above, the processing conditions can be adjusted so as to correct any significant error relative to the target value. Since such a correction is enabled, optimal processing conditions can be set at all times even when the states of workpieces are not consistent or the state of the processing apparatus changes somewhat and, as a result, the processing can be executed to meet even the most rigorous design specifications. Furthermore, workpieces can be processed to become finished products while they are individually measured by the measuring apparatus and the measuring operation can be executed on a specific lot alone or on all the wafers. Thus, the correct processing conditions can be set for each area. Since the processing conditions can be set automatically as described above, the operating rate of each processing apparatus is improved.

In the system achieved in the first aspect or in the method achieved in the second aspect, the measuring apparatus may include a means for self-diagnosis that executes a diagnosis to determine whether or not an abnormality has occurred in the measuring apparatus itself. In this case, the control device should engage the means for self-diagnosis at the measuring apparatus to execute a self-diagnosis if the error in the measurement value indicating the processing results relative to the target value is judged to be equal to or greater than the specific value and should reset the processing conditions for the processing apparatus only if the measuring apparatus itself is determined to be error-free based upon the results of the self-diagnosis. Consequently, even when an abnormality has occurred in the measuring apparatus, the abnormality is not allowed to adversely affect the process control and thus, the accuracy of the control is assured.

The control device employed in the system achieved in the first aspect or in the method achieved in the second aspect may ascertain a correlation between operation data and processing result data by executing a multivariate analysis based upon the operation data related to the operation of the processing apparatus and the processing result data indicating the results of the processing executed by the processing apparatus and may obtain a predictive value that predicts the processing results based upon the correlation and by using operation data obtained while processing a workpiece other than the workpiece for which the correlation has been ascertained. In this case, a correlation (a model expression) can be ascertained simply by collecting a small number of sets of operation data and processing result data obtained through the processing executed on the small number of workpiece, and subsequently, the processing results for a given workpiece can be predicted with ease and a high degree of accuracy simply by applying the operation data obtained while processing the workpiece into the predictive expression.

In addition, in the system achieved in the first aspect or in the method achieved in the second aspect, the control device may engage the transfer apparatus to transfer the workpiece at least having undergone the processing executed by the processing apparatus to the measuring apparatus, compare the measurement value indicating the results of the processing executed on the workpiece obtained based upon the results of the measuring operation executed by the measuring apparatus on the workpiece at least having undergone the processing with the predictive value and regenerate the correlation if the error in the measurement value and the predictive value is judged to be equal to or greater than a predetermined value. In this case, even if the results of the processing executed on a wafer greatly deviate from the predictive value after the correlation (model expression) is first ascertained, the correlation (model expression) is automatically regenerated and updated to maintain a high level of prediction accuracy at all times.

In the system achieved in the first aspect or in the method achieved in the second aspect, the measuring apparatus may include a means for self-diagnosis that executes a diagnosis to determine whether or not an abnormality has occurred in the measuring apparatus itself. In this case, the control device should engage the means for self-diagnosis at the measuring apparatus to execute a self-diagnosis if the error in the measurement value indicating the processing results relative to the predictive value is judged to be equal to or greater than the specific value and should regenerate the correlation only if the measuring apparatus itself is determined to be error-free based upon the results of the self-diagnosis. Consequently, even when an abnormality has occurred in the measuring apparatus, the abnormality is not allowed to adversely affect the correlation (model expression) and thus, the accuracy of the prediction is assured. It is to be noted that in the system achieved in the first aspect or in the method achieved in the second aspect, the multivariate analysis may be executed by adopting the PLS method.

In order to achieve the object described above, a third aspect of the present invention provides a process control system for controlling processing executed on workpieces by at least one processing apparatus installed in each area in a factory and having a processing chamber in which the processing is executed on the workpieces, a measuring unit that executes measurement processing on a workpiece before and after the processing is executed on the workpiece in the processing chamber or either before or after the processing is executed on the workpiece in the processing chamber and a means for in-apparatus transfer capable of transferring the workpiece at least between the processing chamber and the measuring unit, which comprises at least one measuring apparatus installed in the corresponding area and capable of executing measurement processing on workpieces undergoing the processing within the area, a transfer apparatus installed in the area to transfer the workpieces among apparatuses within the area including the processing apparatus and the measuring apparatus and a control device installed in the area to control the processing apparatus the measuring apparatus and the transfer apparatus in the area.

In order to achieve the object described above, a fourth aspect of the present invention provides a method of process control executed by a control device installed in each area in a process control system having installed in each area at least one processing apparatus, at least one measuring unit provided at the processing apparatus, at least one measuring apparatus capable of executing measurement processing on workpieces undergoing processing executed by the processing apparatus, a transfer apparatus that transfers the workpieces among apparatuses including the processing apparatus and the measuring apparatus and the control device that controls the processing apparatus, the measuring apparatus and the transfer apparatus, comprising a step in which a workpiece processed by the processing apparatus undergoes the measurement processing executed by the measuring unit, a step in which processing conditions are set for the processing apparatus based upon the results of the measurement processing executed by the measuring unit and a step in which the workpiece is transferred to the measuring apparatus by the transfer apparatus, undergoes the measurement processing executed by the measuring apparatus and the processing conditions for the processing apparatus are set based upon the results of the measurement processing executed by the measuring apparatus while the measuring unit undergoes maintenance work.

In the system achieved in the third aspect and in the method achieved in the fourth aspect, a measuring apparatus is installed in each area (also referred to as a bay) in a clean room or the like at a factory. In addition, a measuring unit is provided at each processing apparatus in the area. Accordingly, necessary measurement processing is executed within each processing apparatus under normal circumstances, and whenever the measuring unit is not available due to a failure, maintenance work or the like, the measuring apparatus can be used in place of the measuring unit. Thus, if the processing apparatus is still capable of executing the processing on wafers even though the measuring unit is not available, the entire processing apparatus does not need to go down. As a result, the wafer processing cycle time in each area can be shortened and; at the same time, the operating rate and the production capacity in each area can be maximized.

In the system achieved in the third aspect or in the method achieved in the fourth aspect, the measuring apparatus may function as a reference apparatus for the measuring unit at the processing apparatus by verifying that the measurement results obtained by the measuring unit do not deviate from the measurement results obtained by the measuring apparatus or that the deviation is within an allowable range on a regular basis. In this case, any inconsistency among the measurement results obtained by measuring units at the individual processing apparatuses in a given area can be minimized.

In the system achieved in the third aspect or in the method achieved in the fourth aspect, the measuring apparatus may be utilized to prepare measurement processing information required in the measurement processing executed by the measuring unit at each processing apparatus so as to allow the measuring unit to execute the measurement processing based upon the measurement processing information. By adopting such a structure, the measuring unit at each processing apparatus in the area is kept in a ready state for device production operation or the like at all times. As a result, the production capacity in the area is not compromised.

In the system achieved in the third aspect or in the method achieved in the fourth aspect, the measurement processing information mentioned above may be, for instance, coordinate information used when setting coordinates to specify a measuring point on the workpiece information indicating the film thickness of a film on the workpiece, information on a substance deposited on the workpiece, information on the width of a pattern formed on the workpiece or information on defects present on the workpiece or information on an overlay of patterns formed on the workpiece.

In order to achieve the object described above, a fifth aspect of the present invention provides a process control system for controlling processing executed on workpieces by at least two different types of processing apparatuses installed in each area in a factory, which comprises at least one measuring apparatus installed in the corresponding area to execute a measuring operation on a workpiece undergoing the processing in the area, a transfer apparatus installed in the area to transfer the workpiece among apparatuses including the processing apparatuses and the measuring apparatus in the area and a control device installed in the area to control the processing apparatuses, the measuring apparatus and the transfer apparatus in the area. In this process control system, data indicating processing conditions for the different types of processing apparatuses, as well as a single type of processing apparatus, can be exchanged.

In order to achieve the object described above, a sixth aspect of the present invention provides a process control system installed for controlling processing executed on workpieces by at least one processing apparatus in each area in a factory and having a processing chamber in which the processing is executed on the workpieces, a measuring unit that executes measurement processing on a workpiece before and after the processing is executed on the workpiece in the processing chamber or either before or after the processing is executed on the workpiece in the processing chamber and a means for in-apparatus transfer capable of transferring the workpiece at least between the processing chamber and the measuring unit, which comprises at least one measuring apparatus installed in the corresponding area and capable of executing measurement processing on workpieces undergoing the processing within the area, a transfer apparatus installed in the area to transfer the workpieces among apparatuses within the area including the processing apparatus and the measuring apparatus and a control device installed in the area to control the processing apparatus, the measuring apparatus and the transfer apparatus in the area and implements control so as to engage the measuring unit of another processing apparatus to execute the measurement processing on a workpiece undergoing the processing executed by a given processing apparatus if the measuring unit of the given processing apparatus is not available for use. This system reduces the wafer processing cycle time in each area and, at the same time, maximizes the operating rate and the production capacity in the area.

According to the present invention, a process control system and a process control method that improve the operating rate of each processing apparatus while reducing the length of time (cycle time) to elapse from processing through inspection processing are provided.

DETAILED DESCRIPTION OF THE PREFERRED EMBODIMENTS

Figure 1:
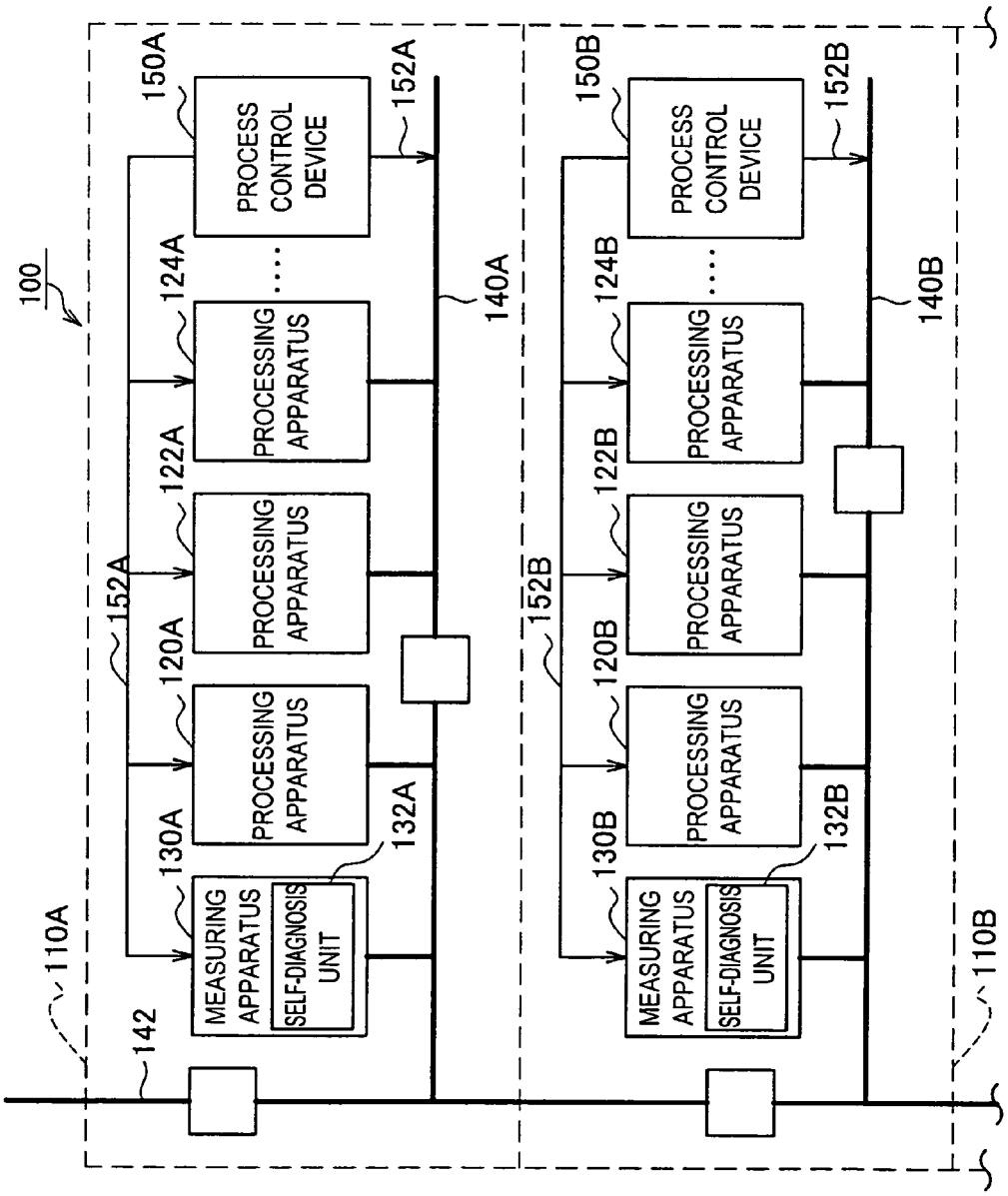
FIG. 1 is a block diagram of the structure adopted in the process control system achieved in a first embodiment of the present invention.

The following is a detailed explanation of the preferred embodiments of the present invention, given in reference to the attached drawings. It is to be noted that in the specification and the drawings, the same reference numerals are assigned to components having substantially identical functions and structural features to preclude the necessity for a repeated explanation thereof.

The process control system achieved in the first embodiment controls semiconductor device manufacturing processes. FIG. 1 schematically illustrates the overall structure of the process control system. The process control system 100 is installed in a clean room at, for instance, a semiconductor manufacturing plant.

The space inside the clean room is divided into a plurality of areas (to be referred to as "bays" in this document) 110 (110A, 110B . . . ). The number of bays in the clean room corresponds to the manufacturing steps that need to be executed to manufacture semiconductor devices.

In each bay 110 (110A, 110B . . . ), a plurality of processing apparatuses 120 (120A, 120B . . . ), 122 (122A, 122B . . . ), 124 (124A, 124B . . . ) that process wafers are installed. The processing apparatuses 120, 122, 124 . . . may be, for instance, etching apparatuses, CVD (chemical vapor deposition) apparatuses, coaters/developers, wafer cleaning tools, CMP (chemical mechanical polishing) apparatuses, PVD (physical vapor deposition) apparatuses, exposure apparatuses or ion implanters. It is to be noted that in the following explanation, all the processing apparatuses 120, 122, 124 . . . in a given bay 110 may be simply referred to as the processing apparatuses 120, unless specifically stated otherwise.

In each bay 110, at least one measuring apparatus 130 that executes a measuring operation on wafers processed in the bay 110 is installed. The measuring apparatus 130 may execute the measuring operation on the wafers before and after they undergo the processing or only before or after they undergo the processing. The measuring apparatus may be a film thickness measuring apparatus, an ODP (optical digital profiler) or an FTIR. It is to be noted that a plurality of measuring apparatuses 130 may be installed in each bay 110. In addition, the measuring apparatus 130 may include a self-diagnosis unit 132 which embodies an example of a means for self-diagnosis that executes a self-diagnosis to determine whether or not any abnormality exists in the circuits constituting the measuring apparatus itself.

A transfer apparatus is installed in each bay 110. The transfer apparatus includes a bay transfer path 140 (140A, 140B . . . ) installed at the bay 110. The bay transfer path 140 is a transfer path through which wafers are transferred among the individual processing apparatuses 120 or between the processing apparatus 120 and the measuring apparatus 130 in the bay 110. The bay transfer paths 140 are connected to a main transfer path 142 which is a transfer path connecting the individual bays 110. The transfer apparatuses may be, for instance, OHTs (overhead hoist transports) or AGBs (automatic guided vehicles). The transfer paths 140 and 142 may each be constituted of a rail so that the wafers held in, for instance, FOUPs or wafer cassettes are transported on vehicles guided along the rails.

A process control device 150, which embodies an example of a control device that individually controls the processing apparatuses 120, 122, 124, the measuring apparatus 130 and the transfer apparatus in the bay 110 is installed in each bay 110. The process control device 150 (150A, 150B . . . ), the individual processing apparatuses 120 (120a, 120B . . . ), 122 (122A, 122B . . . ), 124 (124A, 124B . . . ) . . . , the measuring apparatus (130A, 130B . . . ) and the transfer apparatus in a given bay 110 ((110A, 110B . . . ) are all connected via a network 152 (152A, 152B . . . ) so as to enable data and signal exchange among the process control device 150, the individual processing apparatuses 120, the measuring apparatus 130 and the transfer apparatus via the network 152.

The process control device 150 engages the measuring apparatus 130 in a measuring operation on wafers processed by, for instance, a processing apparatus 120 and sets processing conditions for the processing apparatus 120 based upon the results of the measuring operation. More specifically, it may determine the processing conditions under which a model expression with regard to the processing results is generated based upon the results of the measuring operation by the measuring apparatus 130. A specific example of the processing executed by the processing apparatus 120 is to be explained in detail later.

The process control device 150 includes a microprocessor having, for instance, a CPU (central processing unit), a ROM (read only memory) having stored therein programs used to control various circuits and a RAM (random access memory) with a memory area where a program read out by the CPU from the ROM (read only memory) as necessary is stored in an expanded form. It may also include a means for recording such as a hard disk device, a means for input such as a keyboard, a means for display such as an LCD display device and a means for warning that issues a warning in the event of an abnormality and the like.

Figure 2:
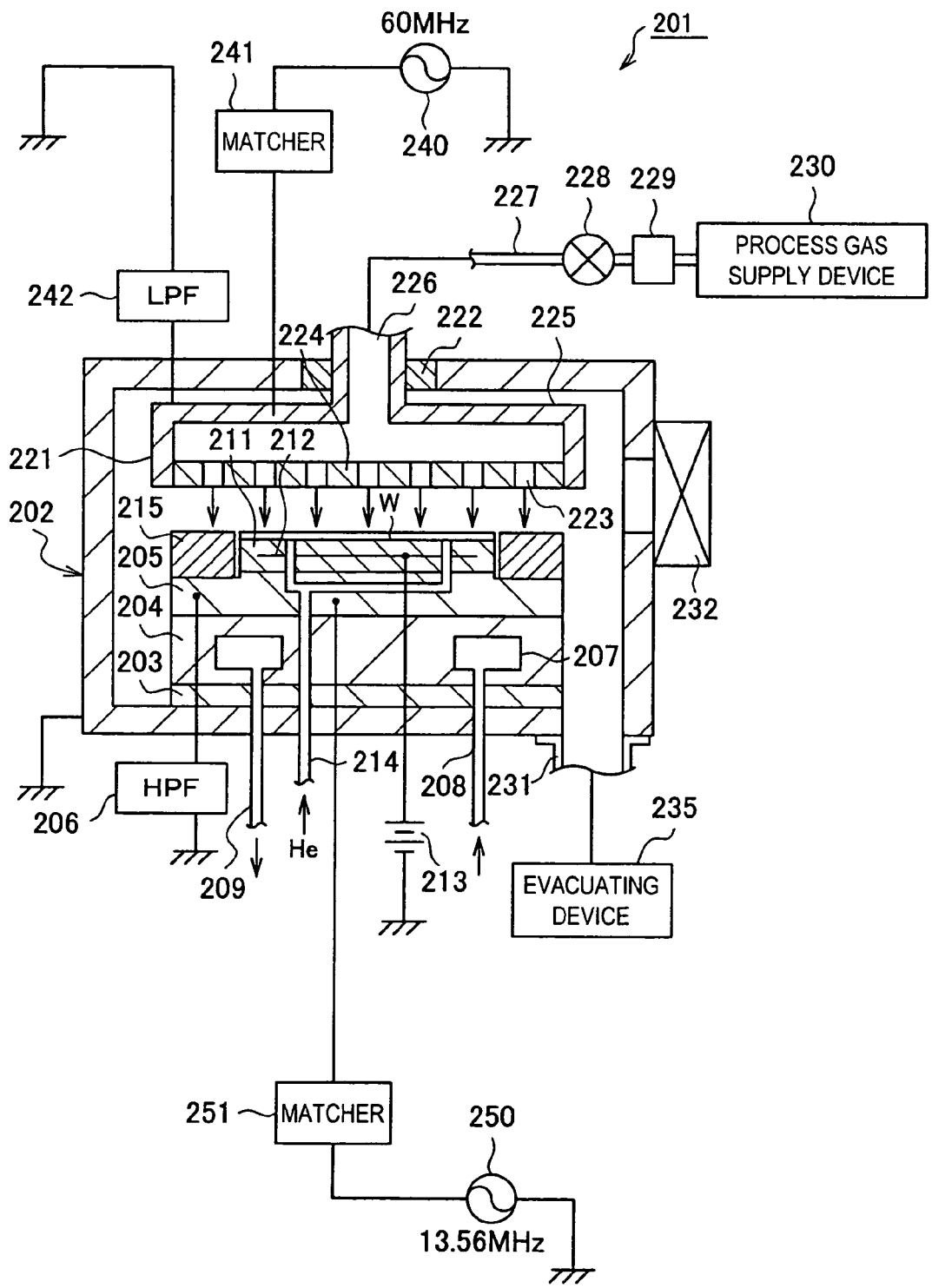
FIG. 2 is a sectional view schematically illustrating the structure of an etching apparatus representing an example of the processing apparatuses used in the embodiment.

Next, an etching apparatus which embodies an example of the processing apparatus 120 is explained in reference to a drawing. FIG. 2 is a schematic sectional view of the structure adopted in the etching apparatus. The etching apparatus 201 is a capacitive coupling type plane parallel etching apparatus having an upper electrode plate and a lower electrode plate that extend parallel to each other and face opposite each other with a plasma forming source connected to one of the electrode plates.

The etching apparatus 201 includes a cylindrical chamber (processing chamber) 202 constituted of aluminum and having anodized surfaces (anodic-oxide coated surfaces), and the chamber 202 is grounded. Inside the chamber 202, a susceptor stage 204 assuming a substantially columnar shape, on which a wafer W is placed, is provided at the bottom via an insulating plate 203 constituted of ceramic or the like. A susceptor 205 constituting a lower electrode is disposed atop the susceptor stage 204. A high pass filter (HPF) 206 is connected to the susceptor 205.

A temperature control medium chamber 207 is formed inside the susceptor stage 204. The temperature control medium is supplied into the temperature control medium chamber 207 via a supply pipe 208 to circulate in the temperature control medium chamber 207 therein, and the temperature control medium is then discharged through a discharge pipe 209. By circulating the temperature control medium in this manner, the temperature of the susceptor 205 can be controlled to maintain a desirable level.

The susceptor 205 is formed in a disk shape and includes a projecting central portion on the upper side thereof. An electrostatic chuck 211 assuming a shape substantially identical to that of the wafer W is provided atop the susceptor 205. The electrostatic chuck 211 adopts a structure achieved by inserting an electrode 212 between insulating members. As a DC voltage of, for instance, 1.5 kV is applied to the electrostatic chuck 211 from a DC source 213 connected to the electrode 212, the electrostatic chuck 211 holds the wafer W through electrostatic force.

A gas passage 214, through which a heat transfer medium (e.g., a backside gas such as He gas) is supplied to the rear surface of the wafer W undergoing the processing is formed at the insulating plate 203, the susceptor stage 204, the susceptor 205 and the electrostatic chuck 211, and heat is transferred between the susceptor 205 and the wafer W via the heat transfer medium to sustain the temperature of the wafer W at a specific level.

At the edge of the susceptor 205 at the upper end, a circular focus ring 215 is disposed so as to surround the wafer W placed on the electrostatic chuck 211. The focus ring 215, which is constituted of an insulating material such as ceramic or quartz or an electrically conductive material, improves the uniformity of etching.

In addition, above the susceptor 205, an upper electrode 221 is provided so as to run parallel to and face opposite the susceptor 205. The upper electrode 221 is supported in the chamber 202 via an insulating member 222. The upper electrode 221 comprises an electrode plate 224 facing opposite the susceptor 205 and having numerous outlet holes 223 and an electrode support member 225 that supports the electrode plate 224. The electrode plate may be constituted of, for instance, quartz, whereas the electrode support member 225 is constituted of an electrically conductive material such as aluminum having anodic-oxide coated surfaces. It is to be noted that the distance between the susceptor 205 and the upper electrode 221 can be adjusted.

At the center of the electrode support member 225 of the upper electrode 221, a gas supply port 226 is formed. A gas supply pipe 227 is connected to the gas supply port 226. In addition, a process gas supply source 230 is connected to the gas supply pipe 227 via a valve 228 and a mass flow controller 229.

An etching gas with which plasma etching is executed is supplied from the process gas supply source 230. It is to be noted that while a single process gas supply system constituted of the process gas supply source 230 and the like described above is shown in FIG. 2, a plurality of such process gas supply systems are installed in reality so as to supply the etching gas into the chamber 202 by individually controlling the flow rates of the gases constituting the etching gas, e.g., $CF_4$, $O_2$, $N_2$ and $CHF_3$.

An evacuation pipe 231 is connected at the bottom of the chamber 202, and an evacuation device 235 is connected to the evacuation pipe 231. The evacuation device 235 includes a vacuum pump such as a turbo molecular pump and is capable of evaluating the chamber 202 so that the atmosphere inside the chamber 202 achieves a specific lowered pressure level (e.g., 0.67 Pa or lower). In addition, a gate valve 232 is provided at the side wall of the chamber 202. The wafer W in a wafer cassette or the like is transferred between the bay transfer path 140 and the chamber while the gate valve 232 is in an open state.

A first high-frequency source 240 is connected to the upper electrode 221 and a matcher 241 is inserted in the power supply line. A low pass filter (LPF) 242 is connected to the upper electrode 221, as well. The power from the first high-frequency source 240 has a frequency within a range of 50 to 150 MHz. By applying power with such a high frequency, plasma achieving a desirable state of disassociation is formed in high density inside the chamber 202, and thus, plasma processing can be executed under lower pressure conditions compared to the related art. It is desirable to set the frequency of the power from the first high-frequency source 240 to 50 to 80 MHz, and typically, the frequency is set to approximately 60 MHz, as shown in the figure.

A second high-frequency source 250 is connected to the susceptor 205 constituting the lower electrode, and a matcher 251 is inserted in the power supply line. The power from the second high-frequency source 250 has a frequency within a range of several hundred kHz to 10-plus MHz. By applying the power with the frequency set within this range, desirable ionization is achieved without damaging the wafer W undergoing the processing. The frequency of the power from the second high-frequency source 250 is typically set to 13.56 MHz, as shown in the figure, or to 2 MHz or the like.

Next, a specific example of the process control executed in the process control system in the embodiment is explained. In this example, the etching apparatus 201 described above constitutes the processing apparatus 120, the measuring apparatus 130 measures pattern shape elements on the wafer and the extent to which the mask (e.g., an organic reflection-reducing film) is trimmed is controlled.

Such mask trimming is an effective means for achieving finer wiring or the like on the wafer. Namely, when a specific pattern is formed on the wafer through a photolithography step, it is normally difficult to form a mask layer with a line width equal to or smaller than approximately 0.07 μm due to technological limits imposed in the exposure/development steps. However, by setting an initial line width of the mask layer greater than the line width to be ultimately achieved and reducing the line width (trimming the mask layer) through an etching step, wiring achieving a smaller line width can be formed without having to assure a very small mask layer line width while the mask layer is exposed and developed.

Through tests and the like, it has been confirmed that the extent to which the mask is trimmed can be controlled by, for instance, adjusting the flow rate ratio ($O_2$ flow rate/$CF_4+O_2$ flow rate). Accordingly, pattern shape elements of the pattern formed on a wafer are measured by the measuring apparatus 130, the flow rate ratio (($O_2$ flow rate/($CF_4+O_2$) flow rate) is controlled based upon the results of the measurement and a pattern conforming to the design specifications is formed on the wafer in the embodiment.

First, the relationship between the extent to which the mask (e.g., an organic reflection-reducing film) is trimmed and the flow rate ratio ($O_2$ flow rate/($CF_4+O_2$) flow rate) is explained. In this example, the mask is constituted of an ArF resist. FIG. 3 presents schematic enlargements of a portion of a longitudinal section of a wafer with an ArF resist deposited thereupon.

Figure 3A:
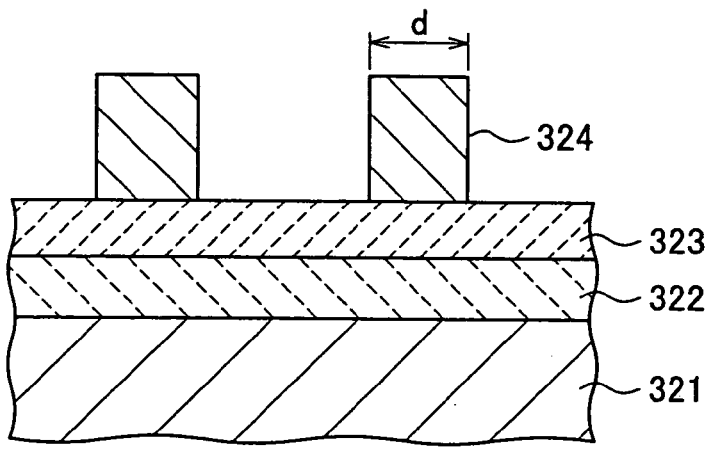
FIGS. 3A, 3B and 3C show the structure of the pattern formed on a wafer in the embodiment.

In the wafer shown in FIG. 3, a silicon oxide film 322 is formed so as to achieve a predetermined film thickness (50 nm in the embodiment) on top of a polysilicon film 321 and an organic anti reflective coating film 323 is formed over the silicon oxide film 322 to achieve a specific film thickness (80 nm in the embodiment), as shown in FIG. 3A. In addition, atop the organic anti reflective coating film 323, an ArF resist 324 with a specific film thickness (240 nm in the embodiment) having been patterned to achieve a specific pattern through the exposure step and the development step mentioned earlier is formed. It is to be noted that the line width (indicated by "d" in the figure) is 80 nm in the embodiment.

Figure 3B:
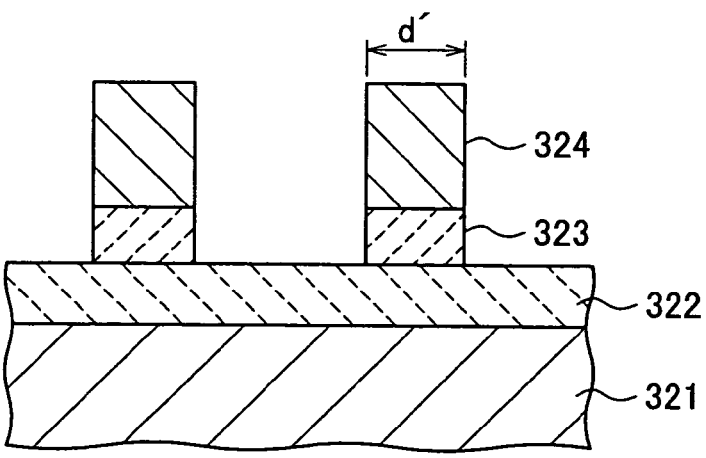

The organic anti reflective coating film 323 is first etched via the ArF resist 324 (mask layer) through plasma etching executed by using an etching gas constituted of $CF_4$ gas and $O_2$ gas in the state shown in FIG. 3A, thereby patterning the organic anti reflective coating film 323 to achieve a specific pattern, as shown in FIG. 3B.

Figure 3C:
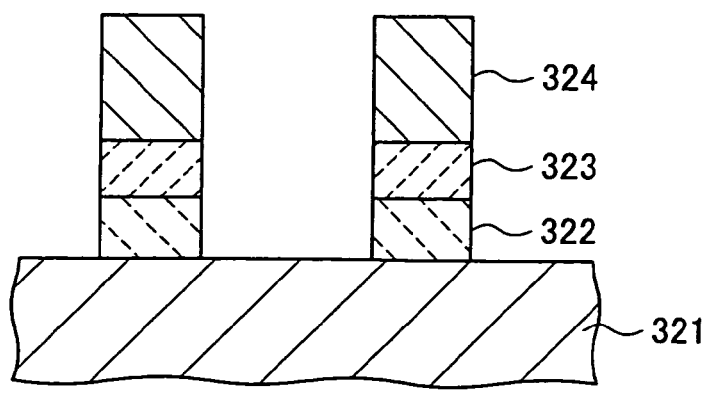

Subsequently, the silicon oxide film 322 in the state shown in FIG. 3B undergoes plasma etching executed by using an etching gas constituted of $CF_4$ gas and $CHF_3$ gas via the ArF resist 324 (mask layer) and the organic anti reflective coating film 323 and, as a result, the silicon oxide film 322 is patterned to achieve a specific pattern as shown in FIG. 3C.

Afterwards, the ArF resist 324 and the organic anti reflective coating film 323 are removed through ashing or the like.

In addition, while the organic anti-reflective coating film 323 undergoing the etching step can be trimmed as described above, the extent to which the organic anti reflective coating film 323 is trimmed can be controlled with ease, and the etching step can be subsequently executed on the silicon oxide film 322 practically without changing the trimmed line width at all.

Wafers having a diameter of 200 mm were each etched under the following conditions through the steps described above. In addition, the etching step was executed a plurality of times by varying the flow rate ratio ($O_2$ flow rate/($CF_4+O_2$) flow rate) in order to ascertain how the trimming amount changed as the flow rate ratio of the $O_2$ gas relative to the total flow rate of the etching gas ($CF_4+O_2$) changed.

The organic anti reflective coating film was etched under the following conditions.
Etching gas: $CF_4+O_2$ (total flow rate 40 sccm)
Pressure: 0.67 Pa (5 mTorr)
High-frequency power applied to the upper electrode: 300 W
High-frequency power applied to the lower electrode: 60 W
Distance between the electrodes: 140 mm
Temperatures at top/wall/bottom: 80/60/75□

He gas pressure (center/edge): 400/400 Pa (3 Torr)
over-etching: 10%

The silicon oxide film was etched under the following conditions.
Etching gas: $CF_4$ (flow rate 20 sccm)+$CHF_3$ (flow rate 20 sccm)
Pressure: 5.3 Pa (40 mTorr)
High-frequency power applied to the upper electrode: 600 W
High-frequency power applied to the lower electrode: 100 W
Distance between the electrodes: 140 mm
Temperatures at top/wall/bottom: 80/30/65□
He gas pressure (center/edge): 1300/1300 Pa (10 Torr)
over-etching: 10%

Figure 4:
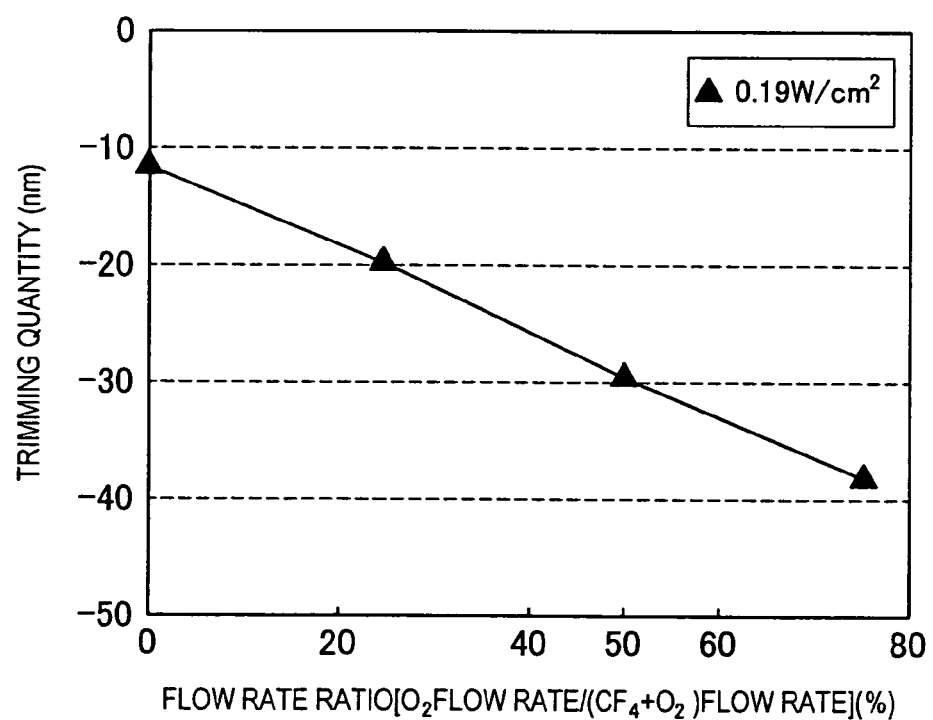
FIG. 4 shows the relationship between the gas flow rate ratio and the trimming amount observed in the embodiment.

The results of control on the trimming amount are shown in FIG. 4. The graph presented in FIG. 4 indicates the relationship between the trimming amount (nm) which is indicated along the vertical axis and the flow rate ratio ($O_2$ flow rate/($CF_4+O_2$) flow rate; %) which is indicated along the horizontal axis. The triangles in the figure each indicate the results of the actual etching processes executed as described above. It is to be noted that the level of the high-frequency power (the RF power density) applied to the lower electrode per unit area was 0.19 w/cm². It was learned that a substantially linear change in the trimming amount could be achieved by changing the flow rate ratio ($O_2$ flow rate/($CF_4+O_2$) flow rate), as shown in the figure.

Figure 5:
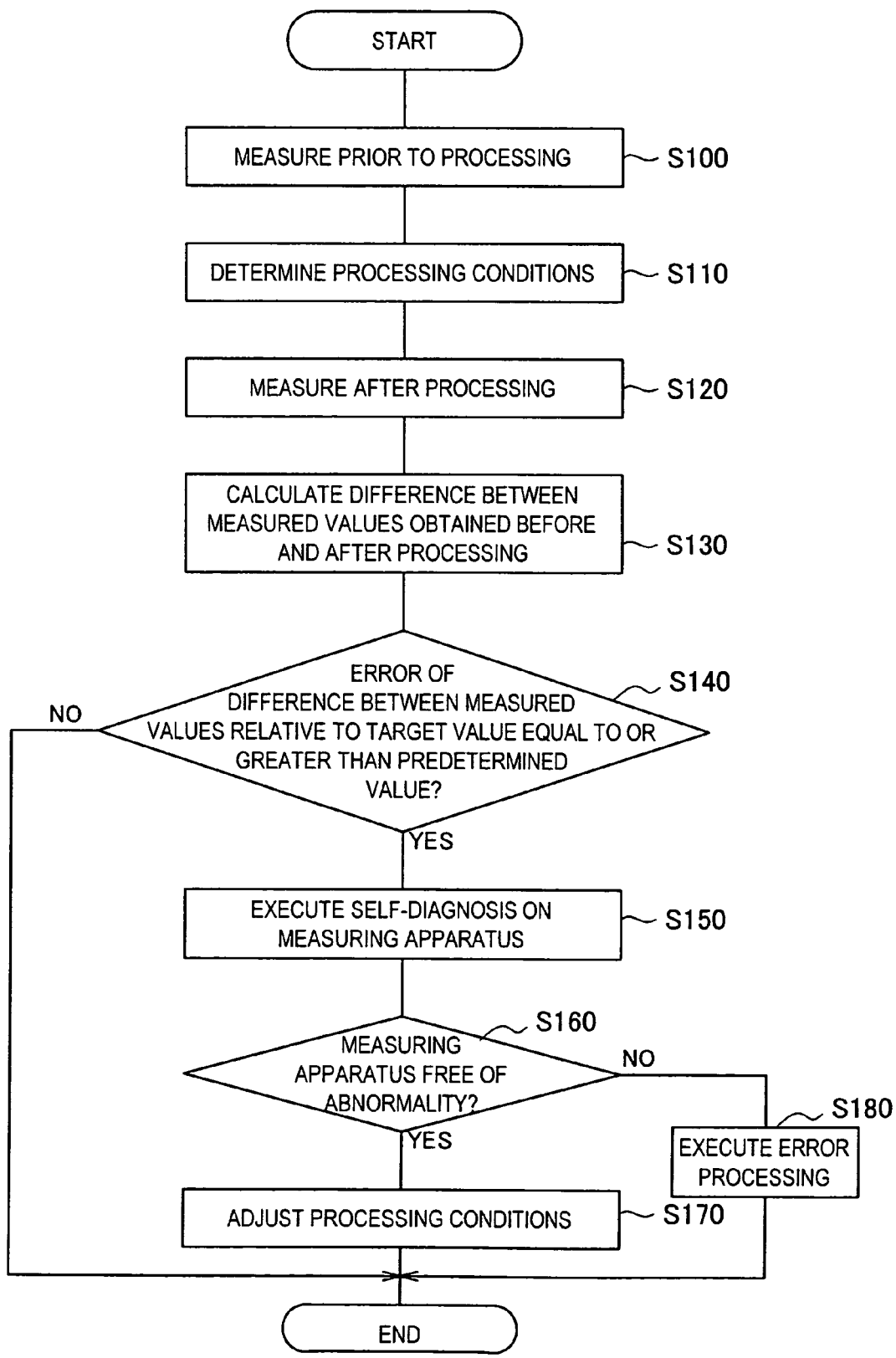
FIG. 5 presents a flowchart of the processing condition adjustment processing executed by the process control device in the embodiment.

Next, formation of a desired pattern on the wafer achieved by controlling the mask trimming amount with the process control system according to the present invention based upon the substantially linear change in the trimming amount resulting from a change in the flow rate ratio ($O_2$ flow rate/($CF_4+O_2$) flow rate) is explained in reference to FIG. 5. FIG. 5 presents a flowchart of the processing condition adjustment processing executed by the process control device 150.

First, the pattern shape of the pattern on the wafer which has not yet been processed is measured in step S 100. Namely, the wafer with the organic anti reflective coating film 323 still unetched is transferred to the measuring apparatus 130 via the transfer path 140, and the measuring apparatus 130 measures the line width d shown in FIG. 3A. After the measuring apparatus 130 finishes the measuring operation, the process control device 150 receives the measurement value from the measuring apparatus 130.

In response, the process control device 150 may determine an optimal condition with regard to the flow rate ratio based upon the relationship between the trimming amount and the flow rate ratio shown in FIG. 4 which is stored in memory in advance, in correspondence to the difference between the pre-etching measurement value having been received and a target value and transmit information indicating the optimal processing condition to the processing apparatus 120 (step S 110). For instance, if the pre-etching measurement value is 80 nm and the target line width to be achieved through the etching processes is 50 nm, i.e., if the target trimming amount is —30 nm, the process control device 150 can determine the flow rate ratio condition of 50% based upon the relationship between the trimming amount and the flow rate ratio shown in FIG. 4 which is stored in memory in advance and transmit information indicating this optimal processing condition to the processing apparatus 120.

Once the pre-etching measurement is completed, the wafer is transferred to the processing apparatus 120 via the transfer path 140 and the processing apparatus 120 etches the organic anti reflective coating film 323 under the optimal processing condition.

Next, the pattern shape after the processing is measured in step S 120. Namely, after the processing apparatus 120 etches the organic anti reflective coating film 323 on the wafer is again transferred to the measuring apparatus 130 which then measures the line width d' shown in FIG. 3B and transmits data indicating the measurement value.

In step S 130, the difference between the values indicating the line width measured before and after the processing is calculated in step S 130. Namely, the difference (e.g., d'–d) between the line widths measured before and after etching the organic anti reflective coating film 323 is calculated. This difference between the measurement values represents the trimming amount.

In the following step S 140, a decision is made as to whether or not the error of the difference between the measurement values, i.e., the trimming amount, relative to the target value (the target trimming amount) is equal to or greater than a specific value. If it is decided in step S 140 that the error of the difference between the measurement values (the trimming amount) relative to the target value is not equal to or greater than the predetermined value, the processing ends.

If, on the other hand, it is decided in step S 140 that the error of the difference between the measurement values (the trimming amount) relative to the target value is equal to or greater than the predetermined value, the self-diagnosis unit 132 of the measuring apparatus 130 is engaged in operation in step S 150 to execute a self-diagnosis on the measuring apparatus 130 and a decision is made in step S 160 as to whether or not any abnormality has occurred in the measuring apparatus 130 itself.

If it is decided in step S 160 that no abnormality has occurred in the measuring apparatus 130 and wafers with substantially equal pre-etching pattern shape measurement values which are measured by the measuring apparatus 130 are to be continuously processed, the processing condition for the etching apparatus 201 constituting the processing apparatus 120 are adjusted in step S 170. More specifically, based upon the relationship between the trimming amount and the flow rate ratio ($O_2$ flow rate/($CF_4+O_2$) flow rate) shown in FIG. 4, the flow rate ratio ($O_2$ flow rate/($CF_4+O_2$) flow rate) is adjusted in correspondence to the error. As a result, the trimming amount is controlled to achieve a value closer to the target value if there has been an error equal to or greater than the predetermined value manifesting between the trimming amount and the target value.

It is to be noted that the state of the fluctuation of the error in the difference between the two measurement values relative to the target value may be observed so as to predict the tendency of the fluctuation and in such a case, the processing condition set for the processing apparatus may be adjusted in conformance to the tendency of the fluctuation error before the error actually exceeds the predetermined value. For instance, if the tendency indicates a gradual increase in the error, the processing condition may be gradually adjusted in correspondence to the tendency, whereas if the tendency indicates a significant increase in the error, the control may be implemented to adjust the processing condition by a greater extent in correspondence to the tendency. By adjusting the processing condition in advance in this manner, control is achieved to ensure that the error never exceeds the predetermined value.

If, on the other hand, it is decided in step S 160 that an abnormality has occurred in the measuring apparatus 130, error processing is executed in step S 180. The process control device 150 engages the means for warning to issue a warning that an abnormality has occurred in the measuring apparatus 130 or engages the means for display to bring up an error display, for instance, as the error processing.

As described above, if there is an abnormality in the measuring apparatus 130 itself, the processing condition set for the etching apparatus 201 is not adjusted, since accurate control cannot be achieved even by adjusting the processing condition in the event of an error in the measuring apparatus 130 itself.

It is to be noted that while the processing in step S 160 and step S 180 is not essential in the processing shown in FIG. 5, the processing in step S 160 and step S 180 prevents any abnormality having occurred in the measuring apparatus 130 from adversely affecting the process control to ensure even more accurate control. In addition, while the measuring apparatus 130 executes the measuring operation both before and after the processing in the flowchart presented in FIG. 5, the present invention is not limited to this example and the measuring operation may be executed only after the processing. For instance, when the processing is executed continuously on successive wafers, the measurement value obtained after the immediately preceding wafer may be stored in memory and the difference between the measurement value stored in memory and the measurement value obtained after processing the current wafer may be calculated.

By providing a measuring apparatus 130 in each bay 110 as described above, the process control device 150 in the bay is enabled to reset the processing conditions for the processing apparatuses based upon the results of measuring operations executed by the measuring apparatus 130 to measure the shapes of the patterns on wafers processed by the processing apparatuses 120, 122, 124 . . . . As a result, accurate process control is assured at all times in each bay.

In addition, a necessary measuring operation can be executed by the measuring apparatus installed in each bay 110 whenever the need arises in the area. As a result, workpieces are not left in a measurement wait state to wait in standby before they can be measured by the measuring apparatus 130 or left in a transfer wait state. In addition, the length of time to elapse between the processing and the measuring operation can be reduced. Thus, the operating rate of each processing apparatus can be improved. Furthermore, since only a measuring instrument that is required to enable the process control in a given area needs to be mounted at the measuring apparatus 130, the equipment investment cost can be lowered.

Also, by providing a measuring apparatus 130 in each bay 110 and controlling the processing executed in the bay with the corresponding process control device 150, the quality of the processed wafers, which eventually become products, indicated by the line width of the pattern formed on the wafers, the film thickness, the dose, the film density and the degree of stress and the distribution state within the wafers can be automatically measured by the measuring apparatus 130 to determine whether or not the wafers have been processed within target specification ranges, instead of using separate wafers for the inspection and the analysis. By implementing the control described above, it becomes possible to adjust the processing conditions so as to correct any significant error relative to the target value. Since such a correction is enabled, optimal processing conditions can be set at all times even when the states of workpieces are not consistent or the state of a given processing apparatus changes somewhat and, as a result, the processing can be executed to meet even the most rigorous design specifications. Furthermore, workpieces can be processed to become products while they are individually measured by the measuring apparatus 130, and the measuring operation can be executed on a specific lot alone or on all the wafers.

Next, the second embodiment of the present invention is explained in reference to the drawings. In this embodiment, the process control device 150 generates a model expression for predicting the results of the processing executed by the processing apparatuses 120, 122, 124 . . . . through a multivariate analysis and implements the process control based upon the model expression.

The processing apparatuses 120 in the embodiment are each identical to the etching apparatus 201 shown in FIG. 2. In addition, the process control device 150 includes a means for multivariate analysis 400 in the embodiment.

Figure 6:
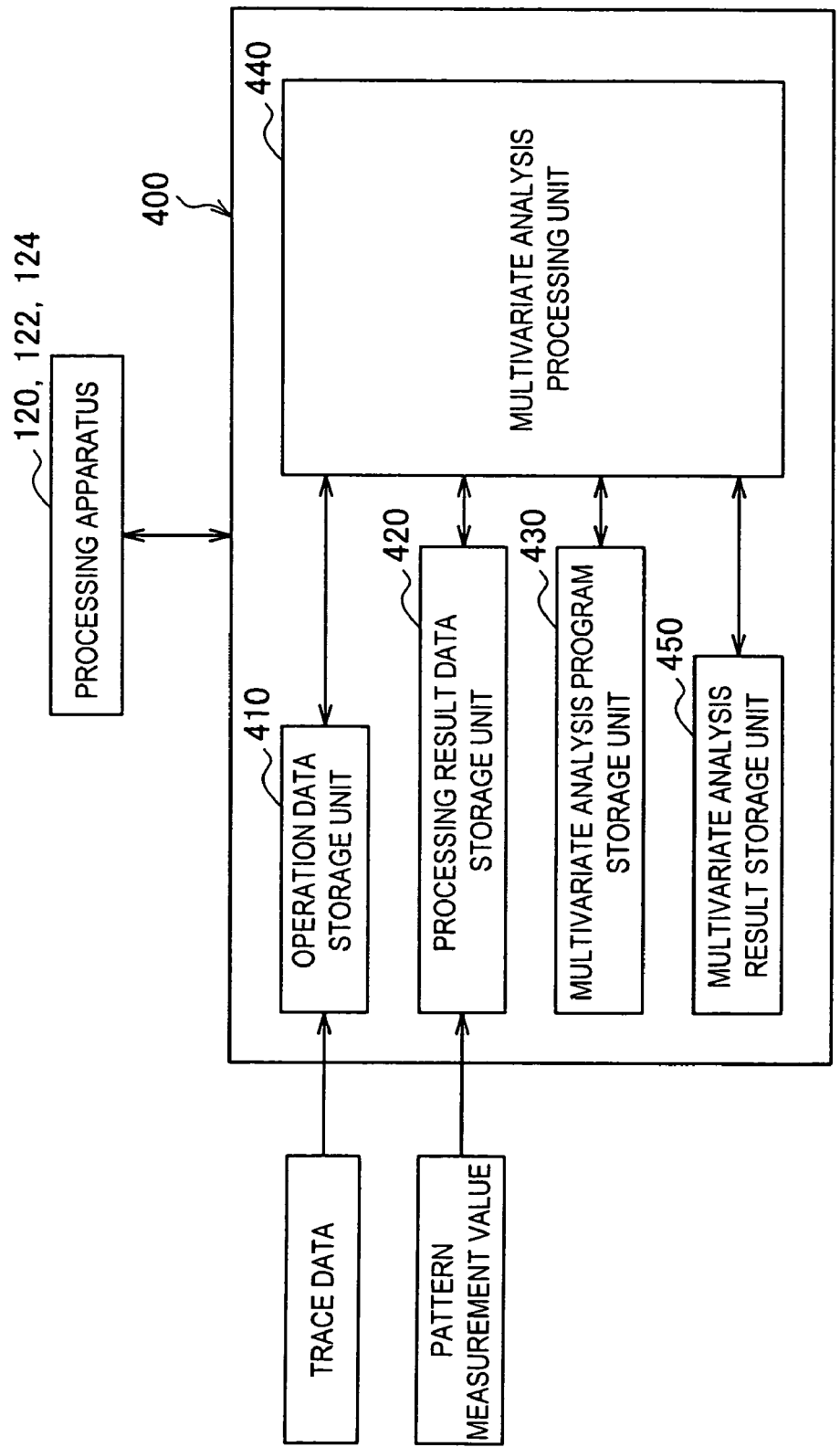
FIG. 6 is a block diagram of the structure adopted in the means for multivariate analysis in a second embodiment of the present invention.

As shown in FIG. 6, the means for multivariate analysis 400 includes an operation data storage unit 410, a processing result data storage unit 420, a multivariate analysis program storage unit 430, a multivariate analysis processing unit 440 and a multivariate analysis result storage unit 450.

The operation data storage unit 410 constitutes a means for storing it in memory operation data, whereas the processing result data storage unit 420 constitutes a means for storing in memory processing result data. The multivariate analysis processing unit 440 constitutes both a means for ascertaining the correlation (e.g., a predictive expression or a recurrence expression) between the operation data and the processing result data and a means for predicting the processing results based upon the correlation. The multivariate analysis result storage unit 450 constitutes a means for storing in memory the correlation determined by the multivariate analysis processing unit 440.

In more specific terms, the means for multivariate analysis 400 may be constituted of a microprocessor or the like that engages in operation in conformance to a program read out from the multivariate analysis program storage unit 430. In addition, the microprocessor constituting the process control device 150 may be utilized as the means for multivariate analysis 400 to execute the multivariate analysis processing. The operation data storage unit 410, the processing result data storage unit 420 and the multivariate analysis result storage unit 450 may each be constituted of a means for recording such as a memory installed in the process control device 150, or they may be constituted by allocating corresponding memory areas at a means for recording such as a hard disk.

After the means for multivariate analysis 400 stores the operation data and process characteristics data input thereto into the operation data storage unit 410 and the processing result data storage unit 420 respectively, it reads out the data and a program stored in the multivariate analysis program storage unit 430 into the multivariate analysis processing unit 440. The operation data and the process characteristics data undergo a multivariate analysis at the multivariate analysis processing unit 440, and the results of the multivariate analysis processing are stored into the multivariate analysis result storage unit 450.

More specifically, the means for multivariate analysis 400 obtains relational expression (1) below (a predictive expression such as a recurrence expression, a model) in which a plurality of types of operation data represent explanatory variable quantities (relating variables) and the processing result data represent related variable quantities (target variable quantities or target variables) by using the multivariate analysis program. In the recurrence expression presented in (1) below, X indicates a matrix of the explanatory variable quantities and Y indicates a matrix of the related variable quantities. In addition, B indicates a recurrent matrix constituted of coefficients (weights) set for the relating variable quantities and E represents a residual matrix.

$$Y = BX + \square\square\square \quad (1)$$

Expression (1) above may be defined through, for instance, the PLS (partial least squares) method described in the JOURNAL OF CHEMOMETRICS, vol. 2 (pp211~228) (1998). By adopting the PLS method, a relational expression for matrices X and Y can be ascertained as long as small numbers of measurement values for X and Y are available even when the matrices X and Y include numerous relating variable quantities and related variable quantities. A marked advantage to the PLS method is that even a relational expression defined based upon a small number of measurement values assures a high degree of stability and reliability.

A program for executing the multivariate analysis processing through the PLS method is stored in the multivariate analysis program storage unit 430, the operation data and the process characteristics data are processed at the multivariate analysis processing unit 440 through the sequence of the program to obtain expression (1) and the results of the multivariate analysis processing are stored into the multivariate analysis result storage unit 450. As a result, once expression (1) is defined, process characteristics can be predicted by applying subsequent operation data in the matrix X as relating variable quantities in the second embodiment. The predictive value thus obtained is highly reliable.

The means for multivariate analysis 400 executes a multivariate analysis by using trace data constituted of measurement data obtained at various monitors (such as various types of measuring instruments) during the actual operation which include gas flow rate measurement data such as the data indicating the flow rate ratio ($O_2$ flow rate/($CF_4+O_2$) flow rate) described earlier and by using pattern measurement values including the trimming amount of the mask (e.g., an organic anti reflective coating film) formed on the wafer as the processing result data to predict the mask trimming amount. It is to be noted that instead of the trace data, data indicating various types of operating condition settings including gas flow rate setting data may be used as the operation data.

In addition to the gas flow rate measurement data, data obtained by measuring the temperatures at a plurality of points (an upper electrode temperature T1, a wall surface temperature T2, a lower electrode temperature T3) inside the chamber 202 may be used as the trace data. The following data may also be incorporated as the trace data.

For instance, an APC (auto pressure controller) valve may be provided at the evacuation device 235 shown in FIG. 2 so as to automatically control the degree of openness of the APC valve in correspondence to the gas pressure inside the chamber 202. The degree of APC opening at the APC valve may then be detected to be incorporated in the trace data.

In addition, a power meter that detects the current and the voltage applied to the electrostatic chuck 211 may be provided so as to incorporate the data indicating the current and the voltage applied to the electrostatic chuck 211 which are detected by the power meter into the trace data.

Also, a mass flow controller, for instance, may be installed in the gas passage 214, through which the heat transfer medium (e.g., He gas) is supplied, to detect the gas flow rate of the heat transfer gas with the mass flow controller. Together with data indicating the gas pressure of the heat transfer gas detected by a pressure gauge, the data indicating the heat transfer gas flow rate may then be incorporated into the trace data.

The matchers 241 and 251 may each comprise two internal variable capacitors and a coil to achieve impedance matching via the variable capacitors C 1 and C 2. Data indicating the positions of the variable capacitors C 1 and C 2 in the impedance matched state may be included in the trace data as well. Furthermore, a power meter may be provided at the matcher 241 or 251 to measure the voltage Vdc between the high-frequency power supply line (electric wire) and the ground of the etching apparatus 201 with the power meter. Data indicating the voltage Vdc between the high-frequency power supply line (electric wire) and the ground may be incorporated into the trace data.

An electric measuring instrument (e.g., a VI probe) may be installed at the matcher 241 on the side toward the upper electrode 221 or at the matcher 251 on the side either toward the susceptor (the lower electrode) 205 i.e., the high-frequency voltage output side, to detect, via the electric measuring instrument, high-frequency voltages V, high-frequency currents 1, high-frequency phases P and impedances Z of the fundamental waves (the advancing wave and the reflected wave of the high-frequency power) and the higher harmonic wave attributable to the plasma generated by the high-frequency power P applied to the upper electrode 221 or the susceptor (the lower electrode) 205 as electrical data. The electrical data corresponding to the advancing wave and the reflected wave of the high-frequency power may then be incorporated into the trace data.

An integrating unit that totals the accumulated length of time over which the high-frequency power has been applied may be connected between the high-frequency source 250 and a power meter, and the accumulated length of high-frequency power application detected by the integrating unit may be included in the trace data. The accumulated length of high-frequency power application time refers to the sum of the lengths of time the high-frequency power has been applied to process individual wafers W.

It is to be noted that the integrating unit mentioned above resets the accumulated length of high-frequency power application to 0 every time the etching apparatus 201 undergoes maintenance work. Accordingly, the accumulated length of high-frequency power application time in this context refers to the accumulated application time for a given maintenance cycle. During the maintenance work, wet cleaning may be performed to remove byproducts (such as particles) of the etching processes executed in the etching apparatus 201 and consumables and measuring instruments may be replaced.

The means for multivariate analysis 400 described above ascertains the relational expression (a recurrence expression) presented in (1) with a multivariate analysis program that enables a multivariate analysis through, for instance, the PLS method by using the trace data or the setting data, i.e., the operation data as explanatory variables and the mask trimming amount indicated by the pattern measurement values (the difference between the line width d and the line width d' in FIG. 3) constituting the processing result data as a related variable (a target variable). Then, it predicts the subsequent mask trimming amount by applying new operation data in the recurrence expression thus ascertained.

In addition, prior to executing the multivariate analysis including the calculation of the relational expression (a recurrence expression) in (1), the multivariate analysis processing unit 440 may execute preliminary processing on the operation data and the processing result data such as MSC (multiplicative signal correction). Such MSC preliminary processing is normally executed to minimize the variance among samples by obtaining an ideal spectrum from the samples. Specifically, in the MSC preliminary processing, an average (ideal spectrum) is calculated along the wavelength for each sample and a linear regression line is calculated for the ideal spectrum in correspondence to the sample. Then, using the inclination and a section obtained from the linear regression line, the data of the sample are corrected. It is to be noted that details of the MSC preliminary processing are provided in, for instance, in Gelad, et al., (1985), Linearization and Scatter-infrared Reflectance Spectra of Meat, Applied Spectroscopy, 3,491–500.

Next, the operation of the etching apparatus 201 is explained. As the etching apparatus 201 starts operating, detection data indicating values intermittently detected with the various measuring instruments such as those mounted at the matchers 241 and 251 at the etching apparatus 201 are sequentially input to the means for multivariate analysis 400 of the process control device 150. Then, the average values are calculated each in correspondence to a specific type of operation data on individual wafers via the multivariate analysis processing unit 440. Next, the average values of the various types of operation data on the individual wafers are stored into the operation data storage unit 410, or the operation waits in standby for the next processing without storing the average values.

A wafer having undergone the etching process is then taken out of the etching apparatus 201 and is transferred to the measuring apparatus 130 via the transfer path 140. The measuring apparatus 130, in turn, calculates the mask trimming amount for the wafer having undergone the etching processes. In more specific terms, the difference between the line width d shown in FIG. 3A having been measured by the measuring apparatus 130 prior to the etching processes and the line width d' shown in FIG. 3B measured by the measuring apparatus 130 following the etching processes is calculated as the trimming amount. After the trimming amount calculated by the measuring apparatus 130 is input to the means for multivariate analysis 400 of the process control device 150, the input value is stored into the processing result data storage unit 420 as processing result data. Then, a recurrence expression (the relational expression in (1)) is defined through the PLS method by directly using the data without executing any preliminary processing or by using the data having undergone the preliminary processing described earlier.

When the etching apparatus 201 is engaged in the actual etching processes, the means for multivariate analysis 400 at the process control device 150 uses the trace data intermittently detected at the various measuring instruments or the setting data, which are input to the process control device 150 as relating variables to calculate a predictive value for the trimming amount, i.e., the target variable, with the recurrence expression obtained through the PLS method as explained earlier.

Figure 7:
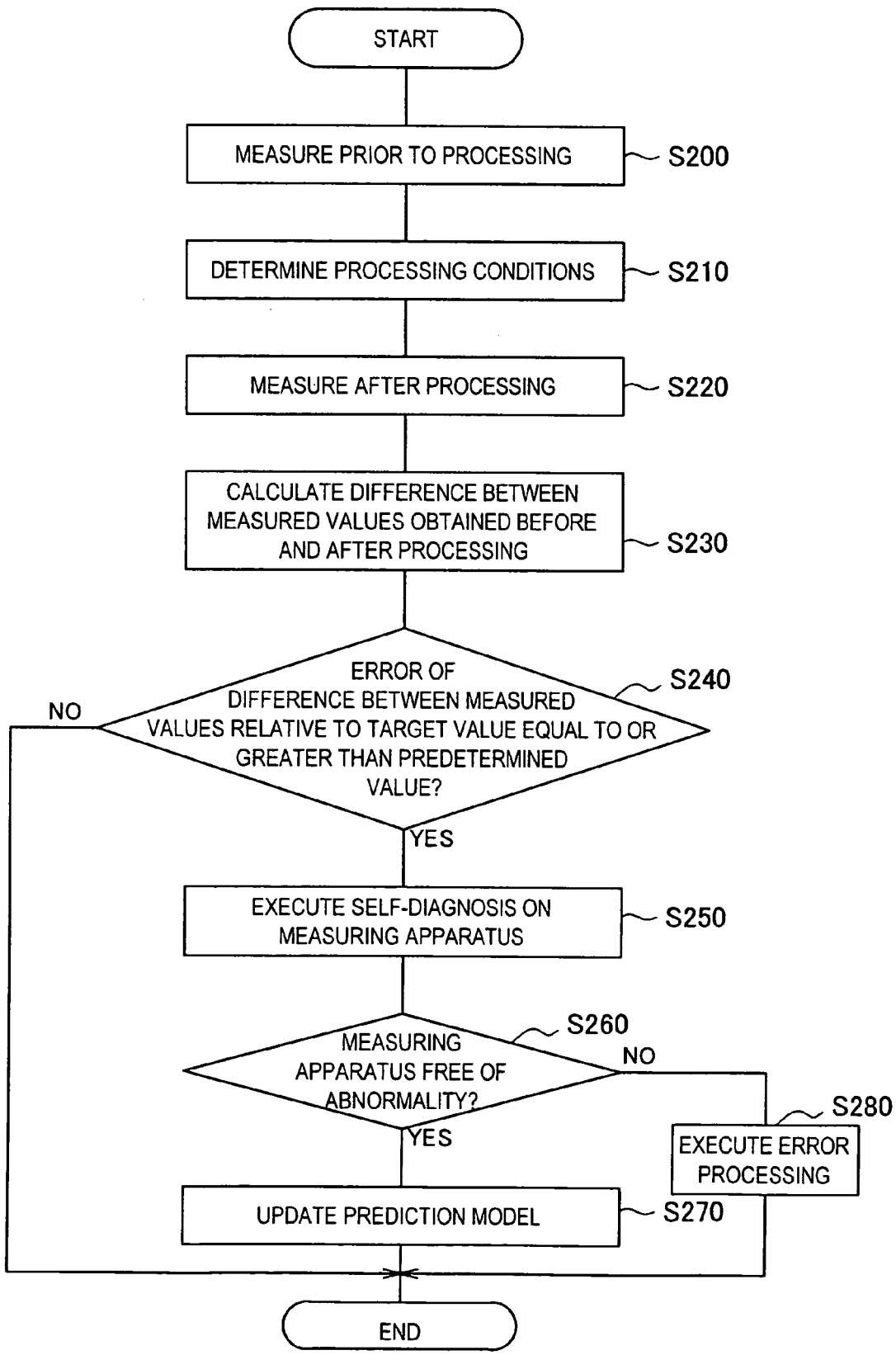
FIG. 7 presents a flowchart of the model expression update processing executed by the process control device in the second embodiment.

Next, model expression update processing executed in the process control system in the embodiment to update the recurrence expression (model expression) defined through the PLS method is explained in reference to the drawings. FIG. 7 presents a flowchart of the model expression update processing executed by the process control device 150.

First, the pattern shape of a wafer that has not undergone the processing is measured in step S 200. Namely, a wafer with its organic anti reflective coating film 323 still unetched is transferred to the measuring apparatus 130 via the transfer path 140 and the measuring apparatus 130 measures the line width d shown in FIG. 3A. Once the measuring apparatus 130 completes the measuring operation, the process control device 150 receives the measurement value from the measuring apparatus 130.

Subsequently, an optimal condition for, at least, the flow rate ratio that greatly affects the trimming amount may be determined based upon the correlation between the trimming amount and various types of setting data including the flow rate ratio stored in advance in the multivariate analysis result storage unit 450 and the optimal condition thus determined may be transmitted to the processing apparatus 120 (step S 210).

Once the pre-etching measurement is completed, the wafer is transferred to the processing apparatus 120 via the transfer path 140 and the processing apparatus 120 etches the organic anti reflective coating film 323 under the optimal processing condition.

Next, the pattern shape after the processing is measured in step S 220. Namely, after the processing apparatus 120 etches the organic anti reflective coating film 323 on the wafer, the wafer is again transferred to the measuring apparatus 130 which then measures the line width d' shown in FIG. 3B and transmits data indicating the measurement value to the process control device 150.

In step S 230, the difference between the values indicating the line width measured before and after the processing is calculated in step S 230. Namely, the difference (e.g., d'–d) in between the line widths measured before and etching the organic anti reflective coating film 323 is calculated. This difference between the measurement values represents the trimming amount.

In the following step S 240, a decision is made as to whether or not the error of the difference between the measurement values, i.e., the trimming amount relative to the predictive value for the trimming amount calculated by the means for multivariate analysis 400 is equal to or greater than a specific value. If it is decided in step S 240 that the error of the difference between the measurement values (the trimming amount) relative to the predictive value is not equal to or greater than the predetermined value, the processing ends.

If, on the other hand, it is decided in step S 240 that the error of the difference between the measurement values (the trimming amount) relative to the predictive value is equal to or greater than the predetermined value, the self-diagnosis unit 132 of the measuring apparatus 130 is engaged in operation in step S 250 to execute a self-diagnosis on the measuring apparatus 130 and a decision is made in step S 260 as to whether or not any abnormality has occurred in the measuring apparatus 130.

If it is decided in step S 260 that no abnormality has occurred in the measuring apparatus 130, the means for multivariate analysis 400 regenerates a model expression to update the initial model expression in step S 270. Thus, after the initial model expression (recurrence expression) is obtained through the PLS method, the model expression (recurrence expression) is updated by automatically generating a new model expression if the wafer processing results greatly deviate from the predictive value and, as a result, the accuracy of the prediction can be maintained at a high level at all times.

It is to be noted that the state of the fluctuation of the error in the difference between the measurement values relative to the predictive value may be observed so as to predict the tendency of the fluctuation and in such a case, the processing condition set for the processing apparatus may be adjusted in conformance to the tendency of the fluctuation error before the error actually exceeds the predetermined value.

For instance, if the tendency indicates a gradual increase in the error, the processing condition may be gradually adjusted in correspondence to the tendency, whereas if the tendency indicates a significant increase in the error, the control may be implemented to adjust the processing condition by a greater extent in correspondence to the tendency. By adjusting the processing condition in advance in this manner, control is achieved to ensure that the error never exceeds the predetermined value.

If, on the other hand, it is decided in step S 260 that an abnormality has occurred in the measuring apparatus 130, error processing is executed in step S 280. The process control device 150 engages the means for warning to issue a warning that an abnormality has occurred in the measuring apparatus 130 or engages the means for display to bring up an error display, for instance, as the error processing. It is to be noted that while the processing in step S 260 and step S 280 is not essential in the processing shown in FIG. 7, the processing in step S 260 and step S 280 prevents any abnormality having occurred in the measuring apparatus 130 from adversely affecting the correlation (model expression) to ensure even more accurate prediction, as in the first embodiment. In addition, while the measuring apparatus 130 executes the measuring operation both before and after the processing in the flowchart presented in FIG. 7 as in the flowchart in FIG. 5, too, the present invention is not limited to this example and the measuring operation may be executed only after the processing. For instance, when the processing is executed continuously on successive wafers, the measurement value obtained after processing the immediately proceeding wafer may be stored in memory and the difference between the measurement value stored in memory and the measurement value obtained after processing the current wafer may be calculated.

By providing the measuring apparatus 130 in each bay 110 as described above, the process control device 150 in the bay is enabled to regenerate the model expression for the processing apparatuses based upon the results of measuring operations executed by the measuring apparatus 130 to measure the shapes of the patterns on wafers processed by the processing apparatuses 120, 122, 124 . . . . As a result, process control based upon accurate prediction is assured at all times in each bay.

It is to be noted that while an explanation is given in reference to the second embodiment on an example in which trace data are used as the operation data, the present invention is not limited to this example. For instance, a spectrometer (hereafter to be referred to as an "optical measuring instrument") that detects a plasma light emission occurring inside the chamber 202 may be installed at the etching apparatus 201 to use optical data indicating the emission spectrum intensity within a specific wavelength range (e.g. 200 to 900 nm) which are obtained by the optical measuring instrument as the operation data.

In addition, an electric measuring instrument (e.g., a VI probe) may be installed at the matcher 241 or 251. VI probe data indicating the high-frequency voltage V, the high-frequency current 1, the high-frequency phase P and the impedance Z of the higher harmonic wave attributable to the plasma generated by applying the high-frequency power P to the upper electrode 221 or the susceptor (the lower electrode) 205 which are obtained via the electric measuring instruments as the operation data.

Furthermore, the operation data may include the trace data, the optical data and the VI probe data, or one of these different types of data may be used as the operation data. The entire trace data may be used as the operation data, or some of the trace data alone may be used as the operation data, as well.

The processing result data obtained through the measuring operation executed by the measuring apparatus may indicate etching characteristics such as the etching pattern line width or the taper angle as in the embodiment or they may instead indicate the etching rate or the within wafer uniformity, for instance.

Also, while recurrence expression (1) is obtained through the PLS method in the multivariate analysis executed in the second embodiment, an inherent value and its inherent vector may instead be ascertained by adopting a method of numerical calculation (e.g., the power method) known in the related art other than the PLS method.

Figure 8:
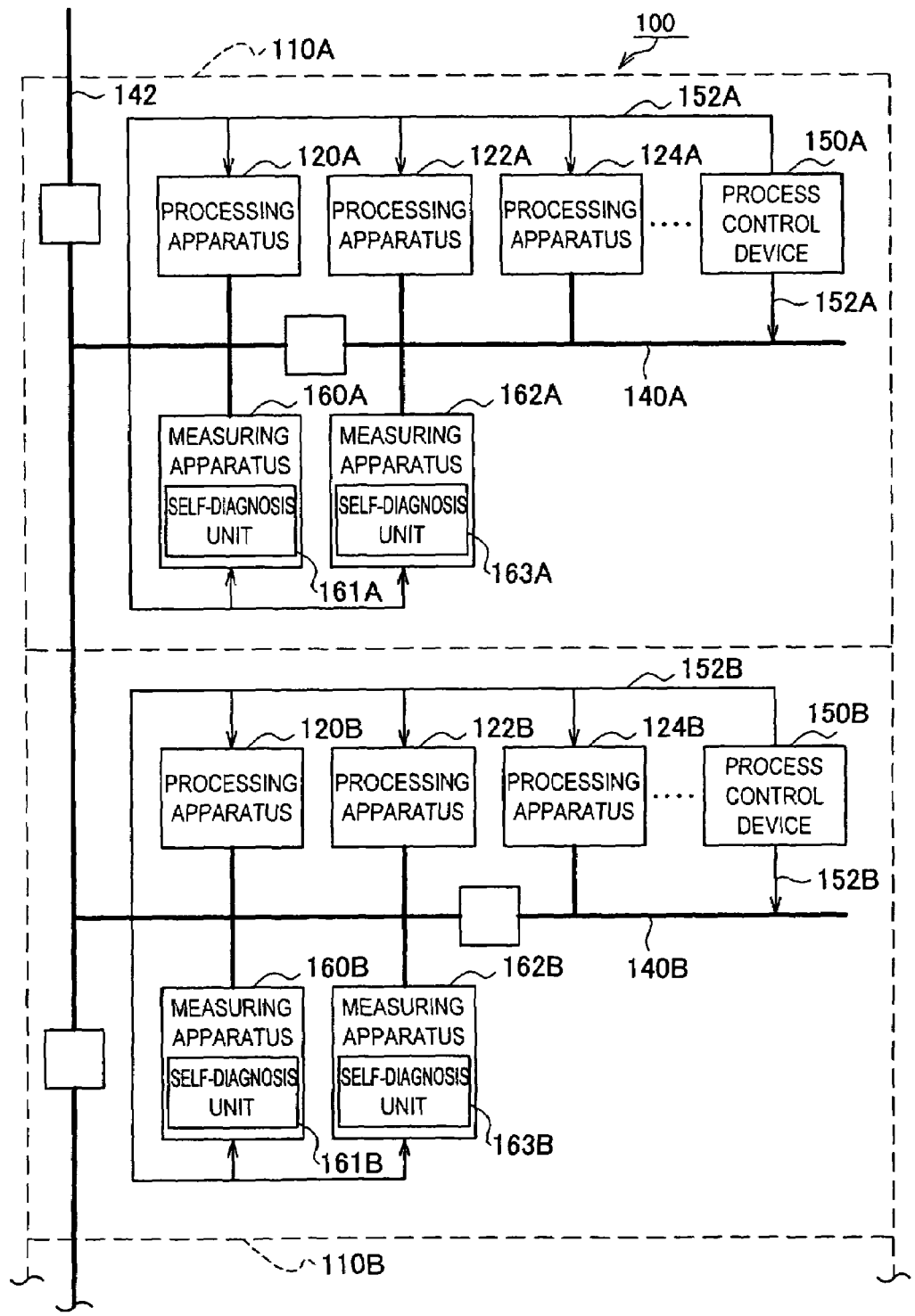
FIG. 8 is a block diagram of another structural example that may be adopted in the process control system according to the present invention.

It is to be noted that while an explanation is given above in reference to the first embodiment and the second embodiment on an example in which a single measuring apparatus is installed in each bay, the present invention is not limited to this example, and two or more measuring apparatuses may be installed in each bay. FIG. 8 presents an example in which two measuring apparatuses 160 and 162 are installed in each bay 110. The measuring apparatuses 160 and 162 respectively include self-diagnosis units 161 and 163. In this process control system, wafers may be transferred to the measuring apparatus 160 before and after they are processed at the processing apparatus 120 to undergo a desired measuring operation at the measuring apparatus 160, and then they may be transferred to the measuring apparatus 162 before and after they are processed at the processing apparatus 122 to undergo a desired measuring operation at the measuring apparatus 162. Alternatively, when the measuring operation at the measuring apparatus 160 is completed, wafers may be transferred to the measuring apparatus 162 to undergo another measuring operation and then they may undergo processing executed at the processing apparatus 124.

Since each bay 110 may include as many measuring apparatuses 130 as necessary, the installation of measuring apparatuses 130 can be planned based upon the processing capability of each measuring apparatus 130 and measuring operations that need to be executed in the bay. As a result, a highly efficient equipment investment is achieved.

Figure 9:
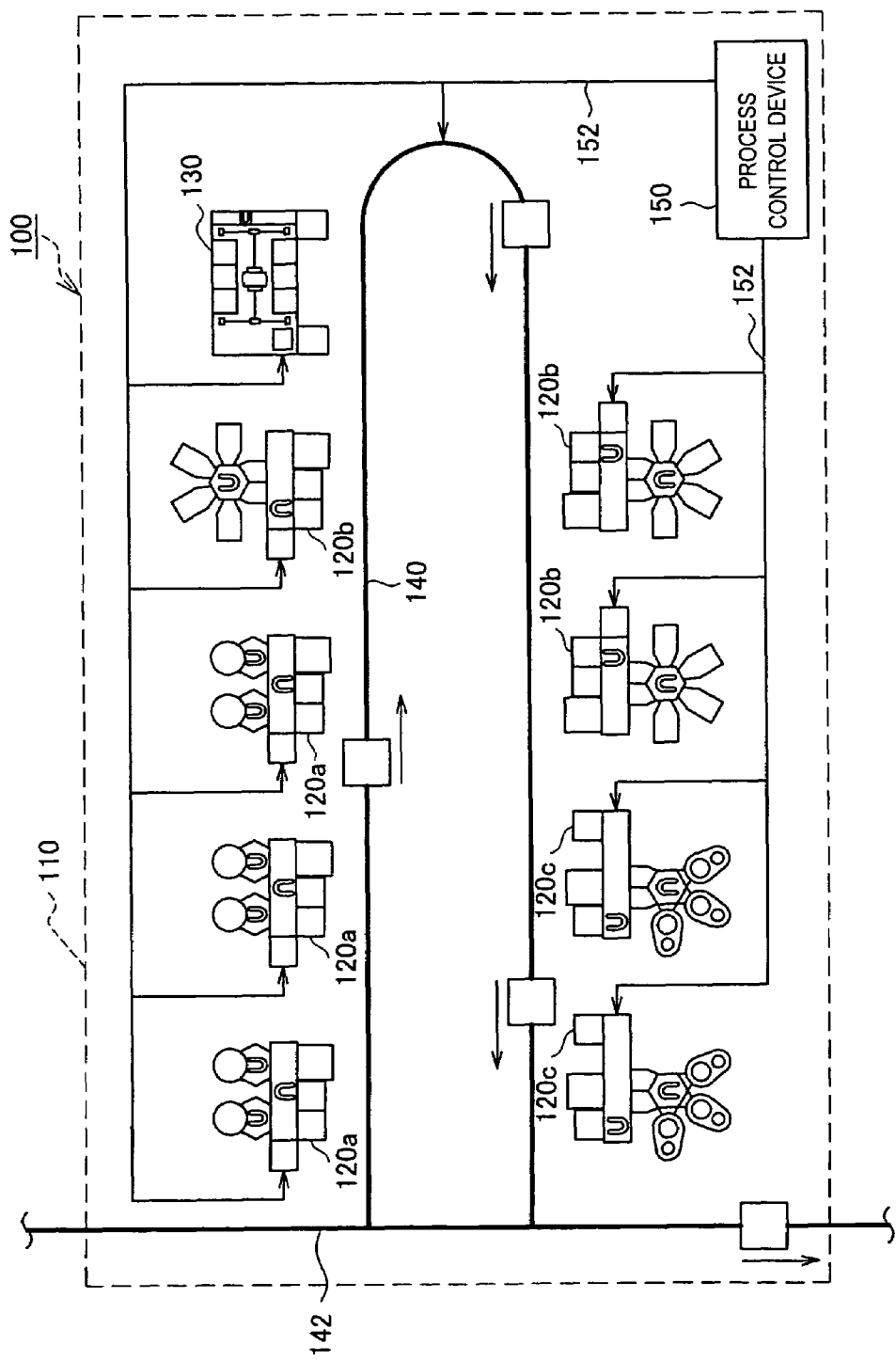
FIG. 9 is a block diagram of another structural example that may be adopted in the process control system according to the present invention.

In addition processing apparatuses installed in each bay may include processing apparatuses of two or more different types, as shown in FIG. 9, for instance. The processing apparatus 120 installed in each bay 110 may include etching apparatuses 120a and 120c and film-deposition apparatuses 120b so as to execute different types of processing on wafers, as shown in FIG. 9. Also, etching apparatuses adopting different processing chamber arrangements, e.g., the etching apparatuses 120c each having a plurality of processing chambers set in a radial pattern and the etching apparatuses 120a each having a plurality of processing chambers set in a single row, may be installed in a given bay.

Furthermore, the bay transfer path 140 of the transfer apparatus in each bay 110 does not need to extend along a straight line as shown in FIG. 1, and it may adopt any of various forms. For instance, the bay transfer path 140 may be formed in a U-shape with each end thereof connected with the main transfer path 142, as shown in FIG. 9. In this case, the processing apparatuses 120 (120a, 126b and 120c) and the measuring apparatus 130 should be clustered around the bay transfer path 140 formed in a U-shape, as shown in FIG. 9. It is to be noted that workpieces may be transferred on the main transfer path 142 and the bay transfer path 140 along the direction indicated by the arrows in FIG. 9, for instance. However, the transfer direction is not limited to that indicated in FIG. 9.

The individual processing apparatuses 120 (120a, 120b and 120c), the measuring apparatus 130, the process control device 150 and the transfer apparatus are all connected via a network 152 so as to allow the processing apparatuses 120 (120a, 120b and 120c), the measuring apparatus 130, the process control device 150 and the transfer apparatus to individually exchange data and signals via the network 152. As a result, data indicating the processing condition set for different types of processing apparatuses, as well as data indicating the processing conditions set for a given type of processing apparatus, can be exchanged.

For instance, when a single type of processing is executed with a single type of processing apparatus, common processing conditions can be generated for the processing regardless of measurement results and, accordingly, the process control device 150 can transmit the same processing conditions to the individual processing apparatuses via the network 152 to set the processing conditions for the processing apparatuses. In contrast, identical processing conditions cannot be set for different types of processing apparatuses since they normally execute different types of processing. However, depending upon the type of measurement object measured by the measuring apparatus 130, appropriate processing conditions can be generated by the process control device for different types of processing apparatuses based upon the results of a given measurement. In such a case, the process control device 150 transmits these processing conditions to the corresponding processing apparatuses and sets the appropriate processing conditions at the individual processing apparatuses. Such a measurement object includes particles (e.g., a deposit, an adherent) present on wafers, defects (e.g., the quantity of defective devices among the devices manufactured through the processing) and the like.

It is to be noted that the network 152, which connects the process control device 150 with the individual processing apparatuses 120 and the measuring apparatus 130 so as to enable bidirectional communication, may be a closed network such as a WAN (wide area network), a LAN (local area network) or an IP-VPN (Internet protocol-virtual private network), or may be a public network such as the Internet. In addition, the connecting medium may be either a wired medium or a wireless medium. It may be an FDDI (fiber distributed data interface)-compliant optical fiber cable, a coaxial cable or a twisted pair cable on Ethernet or it may be a wireless medium conforming to IEEE 802.11b.

Next, the third embodiment is explained in reference to drawings. While an explanation is given above in reference to the first and second embodiments on an example in which a single measuring apparatus 130 constituted as a unit separate from the processing apparatus 120 is installed as independent units in each bay 110 and on an example in which a plurality of measuring apparatuses 160 and 162 are installed in each bay 110, each processing apparatus includes a measuring unit in the third embodiment.

Figure 10:
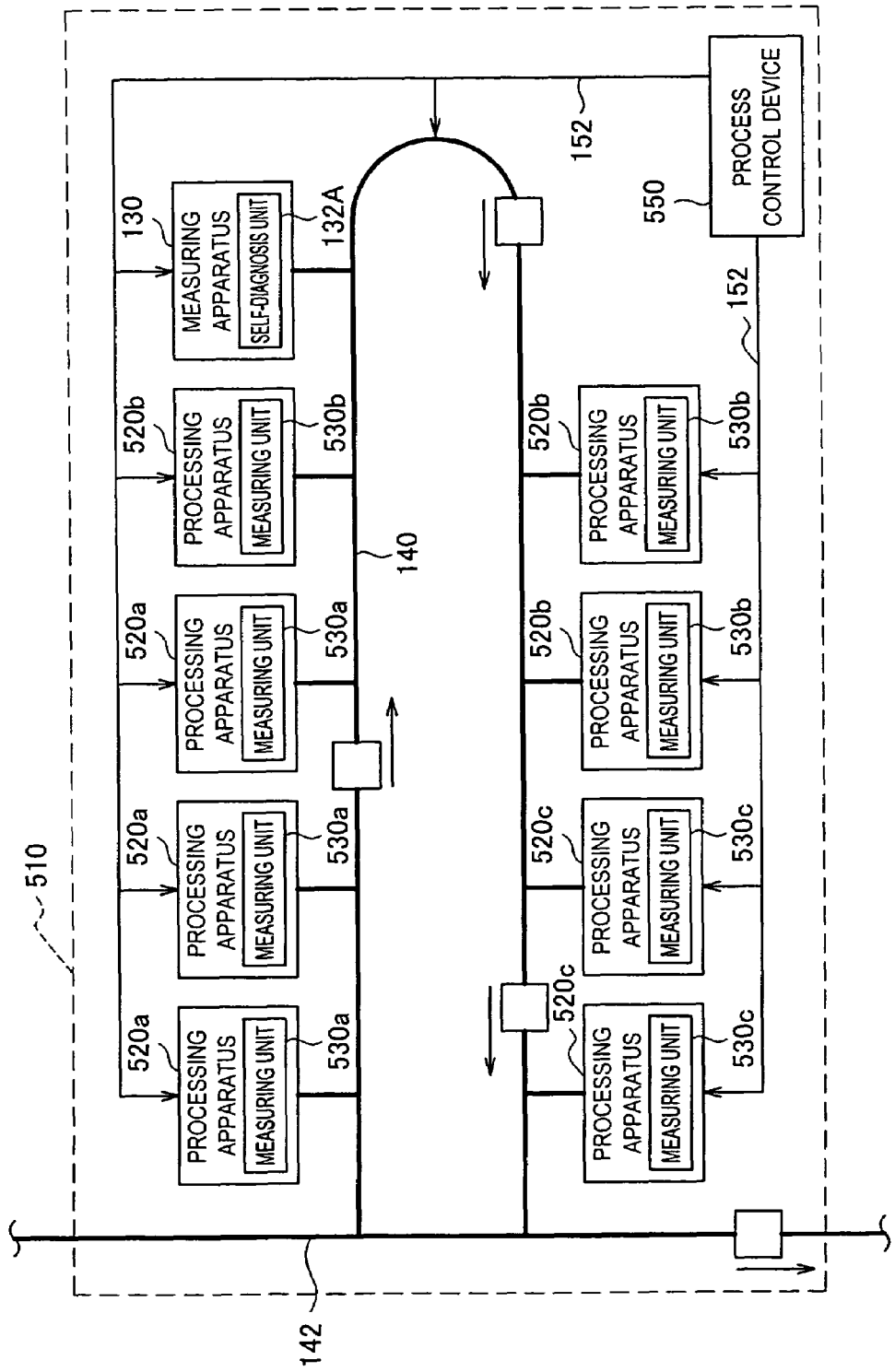
FIG. 10 is a block diagram of the structure adopted in the process control system in a third embodiment of the present invention.

FIG. 10 presents a structural example that may be adopted in a bay 510 in the third embodiment. In the bay 510 achieved in the third embodiment, a plurality of processing apparatuses 520 (520a, 520b and 520c) and a measuring apparatus 130 constituted as a separate unit from the processing apparatuses 520 are clustered around the bay transfer path 140 of the transfer apparatus, as shown in FIG. 10.

The individual processing apparatuses 520, the measuring apparatus 130, a process control device 550 and the transfer apparatus are all connected through a network 152 so as to allow the processing apparatuses 520, the measuring apparatus 130, the process control device 550 and transfer apparatus to individually exchange data and signals via the network 152.

In addition to the measuring apparatus 130, the processing apparatuses 520 (520a, 520b and 520c) in the bay 510 each include a measuring unit 530 (530a, 530b and 530c).

At least the measuring apparatus 130 installed in the same bay can be utilized to measure the same measurement object as that of the measuring units 530 at the processing apparatuses 520. Such a measurement object may be, for instance, the film thickness of a film formed on wafers, particles (a deposit or an adherent) present on wafers, the pattern width of a pattern formed on wafers, the pattern overlay (relative positional accuracy) at wafers or defects present on wafers (e.g., cracking, collapsing of the resist). It is to be noted that if different types of processing apparatus 520 are installed in the bay 510, the measuring apparatus 130 should be capable of measuring all types of measurement objects measured at the individual measuring units 530 of the various types of processing apparatuses 520.

It is to be noted that the processing apparatuses 520 each includes a processing chamber in which wafers undergo processing and a means for in-apparatus transfer capable of transferring wafers at least between the processing chamber and the measuring unit 530 through the atmosphere.

Figure 11:
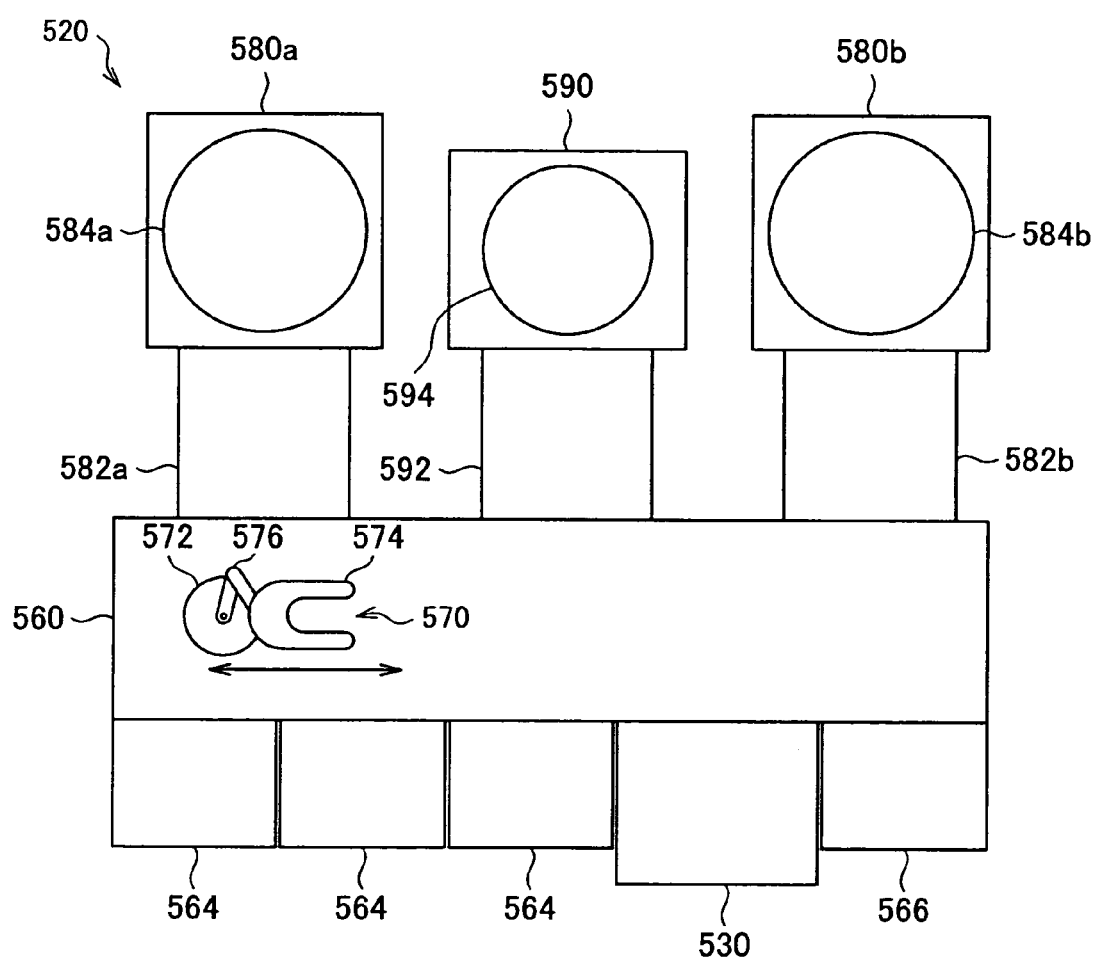
FIG. 11 illustrates a structural example that may be adopted in processing apparatuses in the third embodiment.

An example of a structure that may be adopted in a processing apparatus 520 having the measuring unit 530 described above is presented in FIG. 11. The processing apparatus 520 shown in FIG. 11 includes dry-etching devices 580 (580a and 580b) that dry-etch wafers through plasma processing or the like and a wet-etching device 590 that wet-etches wafers. One of the dry-etching devices, e.g., the dry-etching device 580a in FIG. 11 etches the mask on the wafers, whereas the other dry-etching device 580b is utilized for gate etching.

The dry-etching devices 580 (580a and 580b) and the wet-etching device 590 are all installed in a series along one side of a transfer path 560, each set perpendicular to the transfer path 560. On the other side of the transfer path 560, wafer carry-in units 564 each constituted of a wafer cassette for housing wafers to be carried into the processing apparatus 520, a wafer carry-out unit 566 which carries wafers having undergone the processing out of the processing apparatus 520 and a measurement unit 530 are installed. The measuring unit 530 executes measurement processing on the wafers undergoing the processing in the processing apparatus 520 in which the measuring unit 530 is installed. The measurement processing may be executed by the measuring unit 530 both before and after the wafers undergo the processing or either before or after the processing.

The dry-etching devices 580a and 580b respectively include processing chambers 584a and 584b connected to the transfer path 560 via gates 582a and 582b. Alternatively, the processing chambers 584a and 584b may be connected with the transfer path 560 via transfer chambers having means for transfer such as transfer arms for transferring wafers between the transfer path 560 and the processing chambers 584a and 584b.

The wet-etching device 590 includes a processing chamber 594 which is connected with the transfer path 560 via a treatment chamber 592. Wafers undergo, for instance, chemical processing in the processing chamber 594, whereas they undergo, for instance, treatment processing executed by a using a rinsing solution or the like in the treatment chamber 592. It is to be noted that a means for transfer that transfers wafers between the transfer path 560 and the processing chamber 594 such as a transfer member having a horizontal movement mechanism and a vertical movement mechanism, may be provided at the treatment chamber 592.

A transfer arm 570 capable of moving along the transfer path 560 is provided at the transfer path 560. The transfer arm 570 includes a base 572 capable of moving along the transfer path 560 constituted with a rail or the like and is, a pick 574 on which wafers can be placed and an arm 576 which connects the base 572 and the pick 574 and is capable of extending and contracting the pick 574 relative to the base 572. It is to be noted that the transfer path 560 and the transfer arm 570 described above constitute an example of the means for in-apparatus transfer.

In the processing apparatus 520 described above, wafers carried in by a wafer carry-in unit 564 are transferred by the transfer arm 570 to the individual processing chambers 580a, 580b and 590 in a specific order to undergo specific types of processing. These wafers are transferred to the measuring unit 530 with specific timing as necessary to undergo a specific type of measurement processing at the measuring unit 530. Then, the wafers having undergone the entire series of processing are transferred to the wafer carry-out unit 566 by the transfer arm 570.

In the process control system adopting the structure described above, the measuring apparatus 130 in a given bay 510 is capable of measuring the same measurement objects as those of the measuring units 530 at the processing apparatus installed in the bay and, as a result, the measuring apparatus 130 can be engaged in operation in place of the measuring unit 530 at any of the processing apparatuses in the bay 510, if the measuring unit 530 becomes unavailable due to a failure, maintenance work or the like.

For instance, if the measuring unit 530a of the processing apparatus 520a in FIG. 10 cannot be used, information requesting that the measurement processing be executed by the measuring apparatus 130 is transmitted to the process control device 550 at a time point at which the measurement object needs to be measured in the processing apparatus 520a. In response, a wafer is carried out of the processing apparatus 520a in conformance to the control implemented by the process control device 550 and the wafer carried out of the processing apparatus 520a is then transferred to the measuring apparatus 130 via the transfer path 140 to undergo the necessary measurement processing at the measuring apparatus 130.

Since the measuring apparatus 130 can be used in place of a measuring unit 530 as described above, the entire processing apparatus 520 does not need to go down if the processing apparatus 520 is still capable of executing the processing on wafers even though its measuring unit 530 is not available for use.

As a result, the wafer processing cycle time in each bay 510 can be shortened and, at the same time, the operating rate and production capacity in the bay 510 can be maximized. In other words, the cycle time can be shortened by providing a measuring unit in correspondence to each processing apparatus to eliminate the need to transfer a wafer to the measuring apparatus 130 for each measuring operation. At the same time, if the measuring unit 530 at a given processing apparatus becomes unavailable due to a failure or maintenance work, the measuring apparatus 130 is utilized in place of the measuring unit 530 so as to keep the processing apparatus in operation and, as a result, a higher operating rate can be maintained while reducing the cycle time.

It is to be noted that upon receiving the information requesting that the measurement processing be executed by the measuring apparatus 130 from, for instance, the processing apparatus 520a via the network 152, the process control device 550 may first execute a verification to ascertain whether or not the measuring apparatus 130 is in a measurement-ready state and transmit to the processing apparatus 520 a permission to carry the wafer out of the processing apparatus 520a via the network 552 if the measuring apparatus 130 is in a measurement ready state.

In addition, when the measuring apparatus 130 is utilized to take over the measurement processing of the measuring units 530 as necessary, measurement processing information (e.g., wafer measurement coordinate information) required by the measuring apparatus 130 to execute the wafer measurement processing may be stored in memory at the measuring apparatus 130 in advance. Such measurement processing information may instead be stored in memory at the process control device 550. In this case, when the measuring apparatus 130 needs to execute the measurement processing, the measurement processing information should be transmitted to the measuring apparatus 130 to enable the measuring apparatus 130 to execute the wafer measurement processing based upon the measurement processing information that has been received.

Next, an example in which the measuring apparatus 130 installed in each bay 510 is utilized as a reference apparatus for the measuring units 530 at the individual processing apparatuses 520 in the same bay 510 is explained. By using the measuring apparatus 130 as a reference apparatus for the measuring units 530 in the bay, any deviation of the measurement results obtained at the measuring units 530 of the individual processing apparatuses 520 relative to the measurement results obtained by the measuring apparatus 130 can be eliminated.

More specifically, the measuring apparatus 130 checks on a regular basis whether or not there is any deviation of the measurement results obtained at the measuring units 530 of the individual processing apparatuses 520 relative to the measurement results obtained by the measuring apparatus 130 or whether or not the deviation is within an allowable range. Then, if the deviation of the measurement results at a given measuring unit 530 relative to the measurement results obtained by the measuring apparatus 130 is not within the allowable range, the measuring apparatus 130 may issue a warning or display a message on a display device or the like to indicate that the measuring unit 530 needs to undergo maintenance. By ensuring that any deviation of the measurement results at each measuring unit 530 relative to the measurement results obtained by the measuring apparatus 130 stays within the allowable range at all times as described above, the extent of measurement error manifesting among the individual measuring units 530 of the plurality of processing apparatuses 520 can be kept at a level equal to or lower than a predetermined value. As a result, no significant inconsistency occurs among the measurement results at the measuring units 530 of the individual processing apparatuses 520 in the bay 510.

When using the measuring apparatus 130 as a reference apparatus for the individual measuring units 530 as described above, the measurement error may be controlled in correspondence to each measurement object. When the measurement error of, for instance, critical dimensions of a pattern formed through processing is controlled, a reference wafer having the pattern constituted of lines and spaces formed thereupon is measured by each measuring unit 530 under the measurement error management and the measuring apparatus 130 on a regular basis. Based upon the measurement results, the measuring apparatus 130 verifies that the deviation of the measurement results obtained by the measuring unit 530 relative to the measurement results obtained by the measuring apparatus 130 is within an allowable range. For instance, when 40 nm-critical dimensions are a target of the measurement error management, the allowable range for measurement accuracy should be set equal to or less than 11 nm.

In addition, if the measurement object under the measurement error management is the thickness of a film formed on wafers, a reference wafer having the film formed over the prescribed thickness should be measured on a regular basis by each measuring unit 550 under the measurement error management and the measuring apparatus 130. Based upon the results of the measurements, the measuring apparatus 130 verifies that the deviation of the measurement results at each measuring unit relative to the measurement results obtained by the measuring apparatus 130 is within an allowable range. The allowable range for the measurement accuracy in this case should be set to, for instance, 0.2 nm or less.

If the measurement object under the measurement error management is particles on wafers, a clean wafer free of particles should be measured on a regular basis by each measuring unit 530 under the measurement error control and the measuring apparatus 130. Based upon the results of the measurements, the measuring apparatus 130 verifies that the measurement results obtained by each measuring unit relative to the measurement results obtained by the measuring apparatus 130 is within an allowable range. The allowable range for the measurement accuracy should be set to 10% less for the error occurring in the count of particles in particle sizes of 0.15 μm and larger.

Next, an explanation is given on how the measuring apparatus 130 may be utilized when manufacturing a new type of device in a given bay 510. In the process control system adopting the structure described above, measurement processing information (e.g., wafer measurement coordinate information) required by the measuring units 530 when manufacturing a new type of device with the processing apparatus 520 in the bay can be generated by the measuring apparatus 130 installed in the corresponding bay 510. As a result, the measuring units 530 at the individual processing apparatuses 520 in the bay 510 can be maintained in a ready state for device production operation at all times. This, in turn, ensures that the production capacity in the bay 510 is not compromised.

It is to be noted that if the processing apparatuses 520 (520a, 520b, 520c) shown in FIG. 10 include a plurality of processing apparatuses in each type as in the case of the processing apparatuses 120 (120a, 120b, 120c) shown in FIG. 9, common measurement processing information may be prepared for the measuring units 530 at a given type of processing apparatus 520. The measurement processing information prepared at the measuring apparatus 130 may be transmitted to and set at the measuring units 530 of the individual processing apparatuses 520 via the network 552, or it may be set at the measuring units 530 via a recording medium of the known art.

Now, specific examples of the measurement processing information which is required by the measuring units 530 and the measuring apparatus 130 to execute, for instance, wafer measurement processing are explained. Such measurement processing and information includes, for instance, wafer measurement coordinate information, image recognition conditions and wafer measurement reference information. The wafer measurement coordinate information is coordinate information used to set coordinates of a measuring point on the workpiece. The measuring point can be specified by setting coordinates based upon the wafer measurement coordinate information when a wafer image is read with a means for image capturing such as a CCD (charge coupled device) cameras provided at the measuring units 530 and the measuring apparatus 130.

The image recognition conditions refer to a procedure of digital image processing through which an image is analyzed and recognized based upon optical light information received at the CCD cameras or the like. The digital image processing procedure may include, for instance, a preliminary processing stage during which data are normalized and noise is removed from the data, an extraction stage during which contrast processing such as color density processing, binary processing and gradation processing and filter processing for edge extraction are executed, an arithmetic processing stage during which data comparison, arithmetic processing and the like are executed and a matching stage during which a matching operation is executed with regard to a pre-extracted characteristics quantity. The measuring units 530 and the measuring apparatus 130 execute the wafer measurement processing in conformance to such image recognition conditions, e.g., the digital image processing procedure.

The wafer measurement reference information refers to information indicating a target value that can be used as a reference for a measurement object such as the etching rate or the film thickness. The measuring units 530 and the measuring apparatus 130 compare the wafer measurement reference information, e.g., a target value, with measurement values obtained through actual measurements. Information indicating the results of the comparison may then be utilized in feedback processing executed to provide feedback from the processing executed by the processing apparatuses 520.

It is to be noted that the process control device 550 having received the results of the measurement executed by the measuring unit 530 of each processing apparatuses 520 may judge the stability (e.g., the number of defective devices manufactured from a wafer) of the processing executed at the processing apparatus 520 based upon the measurement results and then may execute processing for optimizing the number of wafers to be measured before and after the processing and the number of measurement points within each wafer based upon the stability, the device management target range (e.g., the target number of devices to be manufactured) with regard to devices manufactured from wafers, and the operating state (e.g., the operating rate) of the processing apparatus 520. Optimization information obtained through such optimization processing may be transmitted to the measuring unit 530 of the corresponding processing apparatus 520 via, for instance, the network 152. Thus, each measuring unit 530 is enabled to execute the measurement processing with the number of wafers undergoing the measurement processing and the number of measurement points within each wafer having been optimized by the process control device 550. As a result, the wafer processing can be achieved with only the absolute minimum volume of measurement processing to reduce the cycle time of the wafer processing within the entire bay 510.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, while an explanation is given above in reference to the embodiments on an example in which the means for multivariate analysis 400 is provided at the process control device 150, and the present invention is not limited to this example and the means for multivariate analysis 400 may be installed at each processing apparatus 120. In this case, a multivariate analysis can be executed and the processing results can be measured by each processing apparatus 120 in response to commands issued by the process control device 150 to reduce the processing onus on the process control device and, as a result, the data processing speed can be improved.

What is claimed is:

1. A process control system that controls processing executed on workpieces by, at least, one processing apparatus installed in each area in a factory, the processing results of which are predictable, comprising:

at least one measuring apparatus that is installed for the corresponding area, executes a measuring operation on workpieces processed in the area, and includes a means for self-diagnosis that executes a diagnosis to determine whether or not an abnormality has occurred in said measuring apparatus;

a transfer apparatus provided for the corresponding area to transfer the workpieces among apparatuses which include said processing apparatus and said measuring apparatus in the area; and a control device installed for the corresponding area to control said processing apparatus, said measuring apparatus and said transfer apparatus in the area, wherein said control device sets a processing condition for said processing apparatus based upon the results of a measuring operation executed by said measuring apparatus on workpieces processed by said processing apparatus, engages said transfer apparatus to transfer the workpiece at least having undergone the processing executed by said processing apparatus to said measuring apparatus, compares a measurement value indicating the results of the processing executed on the workpiece, which is obtained through a measuring operation executed by said measuring apparatus on the workpiece at least having undergone the processing, with a target value for the processing results, engages said means for self-diagnosis at said measuring apparatus to execute a self-diagnosis if an error in the measurement value indicating the processing results relative to the target value is judged to be equal to or greater than a predetermined value, and resets the processing condition for said processing apparatus in correspondence to the error in the measurement value relative to the target value if the error is judged to be equal to or greater than a predetermined value, only if said measuring apparatus is determined to be error-free based upon the results of the self-diagnosis.

2. A process control system according to claim 1, wherein said control device observes the state of a fluctuation in an error in the measurement value relative to the target value so as to predict the tendency of the fluctuation, and resets the processing condition for said processing apparatus in correspondence to the tendency of the fluctuation error before the error exceeds a predetermined value.

3. A process control system that controls processing executed on workpieces by, at least, one processing apparatus installed in each area in a factory, the processing results of which are predictable, comprising:

at least one measuring apparatus that is installed for the corresponding area, executes a measuring operation on workpieces processed in the area, and includes a means for self-diagnosis that executes a diagnosis to determine whether or not an abnormality has occurred in said measuring apparatus;
a transfer apparatus provided for the corresponding area to transfer the workpieces among apparatuses which include said processing apparatus and said measuring apparatus in the area; and
a control device installed for the corresponding area to control said processing apparatus, said measuring apparatus and said transfer apparatus in the area, wherein said control device:
sets a processing condition for said processing apparatus based upon the results of a measuring operation executed by said measuring apparatus on workpieces processed by said processing apparatus,
ascertains a correlation between operation data and processing result data by executing a multivariate analysis based upon the operation data related to an operation of said processing apparatus and the processing result data indicating the results of the processing executed by said processing apparatus,
obtains a predictive value that predicts the processing results based upon the correlation by using operation data obtained through processing executed on a workpiece other than the workpiece for which the correlation has been ascertained, and
engages said means for self-diagnosis at said measuring apparatus to execute a self-diagnosis if an error in the measurement value indicating the processing results relative to the predictive value is judged to be equal to or greater than a predetermined value and re-ascertains the correlation only if said measuring apparatus is determined to be error-free based upon the results of the self-diagnosis.

4. A process control system according to claim 3, wherein said control device
engages said transfer apparatus to transfer the workpiece at least having undergone the processing executed by said processing apparatus to said measuring apparatus,
compares a measurement value indicating the results of the processing executed on the workpiece obtained based upon the results of the measuring operation executed by said measuring apparatus on the workpiece at least having undergone the processing, which is obtained through a measuring operation executed by said measuring apparatus on the workpiece at least having undergone the processing, with the predictive value and
re-ascertains the correlation if the error in the measurement value relative to the predictive value is judged to be equal to or greater than a predetermined value.

5. A process control system according to claim 3, wherein said multivariate analysis is executed by adopting a PLS method.

6. A method of process control executed by a control device in each area in a process control system having installed in each area at least one processing apparatus, the processing results of which are predictable, at least one measuring apparatus, a transfer apparatus, and said control device that controls said processing apparatus, said measuring apparatus and said transfer apparatus, comprising the steps of:
setting a processing condition for said processing apparatus used to process a first workpiece,
transferring the first workpiece at least having undergone the processing executed by said processing apparatus to said measuring apparatus by said transfer apparatus,
obtaining a first workpiece measurement value that indicates the results of the processing executed on the first workpiece through a measuring operation executed by the measuring apparatus on the workpiece at least having undergone the processing,
comparing said first workpiece measurement value with a processing result target value to determine an error in the measurement value relative to the target value,
engaging in a self-diagnosis operation if the error in the first workpiece measurement value indicating the processing results relative to the target value is determined to be equal to or greater than a predetermined value, and
resetting the processing condition for said processing apparatus in correspondence to the error, if the error is determined to be equal to or greater than the predetermined value only if said measuring apparatus is judged to be error-free based upon the results of the self-diagnosis operation.

7. A method of process control according to claim 6 further comprising:
predicting a tendency of a fluctuation of an error in the first workpiece measurement value relative to the target value based on an observation of the state of the fluctuation, and
resetting the processing condition for said processing apparatus in correspondence to the tendency of the fluctuation error before the error exceeds a predetermined value.

8. A method of process control executed by a control device in each area in a process control system having installed in each area at least one processing apparatus, the processing results of which are predictable, at least one measuring apparatus, a transfer apparatus, and said control device that controls said processing apparatus, said measuring apparatus and said transfer apparatus, the method comprising:
transferring a workpiece at least having undergone the processing executed by said processing apparatus to said measuring apparatus by said transfer apparatus,
executing a measuring operation by a measuring apparatus on a workpiece processed by said processing apparatus to obtain a measurement value indicating the results of the processing executed on the workpiece;
setting a processing condition for said processing apparatus based upon the results of the measuring operation executed by said measuring apparatus;
generating a correlation between operation data obtained from said processing apparatus and processing result data indicating the results of the processing executed by said processing apparatus by executing a multivariate analysis based upon the operation data and the processing result data;
calculating a predictive value predicting the result based upon the correlation by using operation data obtained by processing a workpiece other than the workpiece for which the correlation has been ascertained;
comparing said measurement value with the predictive value to determine an error in the measurement value relative to the predictive value;
engaging in a self-diagnosis operation by said measuring apparatus if the error in the measurement value indicating the processing results relative to the predictive value is equal to or greater than the predetermined value to determine if said measuring apparatus is error-free; and regenerating the correlation, if the error in the measurement value relative to the predictive value is judged to be equal to or greater than a predetermined value, only if said measuring apparatus is judged to be error-free based upon the results of the self-diagnosis operation.

9. A method of process control according to claim 8, wherein said multivariate analysis is executed by adopting a PLS method.

10. A method of process control executed by a control device installed in each area in a process control system having installed in each area at least one processing apparatus, at least one measuring unit provided at said processing apparatus, at least one measuring apparatus, a transfer apparatus and said control device that controls said processing apparatus, said measuring apparatus, and said transfer apparatus, the process control method comprising:
    executing measurement processing by said measuring unit on a workpiece processed by said processing apparatus to obtain measurement results;
    setting a processing condition for said processing apparatus based upon the results of the measurement processing executed by said measuring unit; and
    transferring a workpiece to said measuring apparatus by said transfer apparatus,
    executing a measurement processing by said measuring apparatus on the workpiece, and
    setting the processing condition for said processing apparatus based upon the results of the measurement processing executed by said measuring apparatus while said measuring unit undergoes maintenance work.

11. A method of process control according to claim 10, wherein said measuring apparatus functions as a reference apparatus for said measuring unit of said processing apparatus by checking on a regular basis whether or not there is any deviation of measurement results obtained by said measuring unit relative to measurement results obtained by said measuring apparatus or whether or not such a deviation is within an allowable range.

12. A method of process control according to claim 10, further comprising:
    preparing measurement processing information, by said measuring apparatus, that is required by said measuring unit of said processing apparatus to execute the measurement processing; and
    executing the measurement processing by said measuring unit based upon said measurement processing information.

13. A method of process control according to claim 10, wherein said measurement processing information includes coordinate information used to set coordinates specifying a measurement point on the workpiece.

14. A method of process control according to claim 10, wherein an object of measurement executed by said measuring apparatus and said measuring unit of said processing apparatus is the film thickness of a film formed on the workpiece.

15. A method of process control according to claim 10, wherein an object of measurement executed by said measuring apparatus and said measuring unit of said processing apparatus is a deposit present on the workpiece.

16. A method of process control according to claim 10, wherein an object of measurement executed by said measuring apparatus and said measuring unit of said processing apparatus is the width of a pattern formed on the workpiece.

17. A method of process control according to claim 10, wherein an object of measurement executed by said measuring apparatus and said measuring unit of said processing apparatus is defects present on the workpiece.

18. A method of process control according to claim 10, wherein an object of measurement executed by said measuring apparatus and said measuring unit of said processing apparatus is an overlay of patterns formed on the workpiece.

19. A process control system that controls processing executed on workpieces by at least one processing apparatus installed in each area in a factory and having a processing chamber in which the processing is executed on the workpieces, a measuring unit that executes measurement processing on a workpiece before and after the processing is executed on the workpiece in said processing chamber, or either before or after the processing is executed on the workpiece in said processing chamber, and a means for in-apparatus transfer capable of transferring the workpiece at least between said processing chamber and said measuring unit, the process control system comprising:
    at least one measuring apparatus installed in each area and capable of executing measurement processing on workpieces undergoing the processing within the area and including a means for self-diagnosis that executes a diagnosis to determine whether or not an abnormality has occurred in said measuring apparatus;
    a transfer apparatus installed in the corresponding area to transfer the workpieces among apparatuses within the area including said processing apparatus and said measuring apparatus; and
    a control device installed in the corresponding area to control said processing apparatus, said measuring apparatus, and said transfer apparatus in the area,
        to generate a correlation between operation data and processing result data by executing a multivariate analysis based upon the operation data related to an operation of said processing apparatus and the processing result data indicating the results of the processing executed by said processing apparatus,
        to obtain a predictive value that predicts the processing results based upon the correlation by using operation data obtained through processing executed on a workpiece other than the workpiece for which the correlation has been generated,
        to engage said means for self-diagnosis at said measuring apparatus to execute a self-diagnosis if an error in the measurement value indicating the processing results relative to the predictive value is judged to be equal to or greater than a predetermined value,
        to regenerate the correlation only if said measuring apparatus is determined to be error-free based upon the results of the self-diagnosis, and to engage the measuring unit of another processing apparatus to execute the measuring processing on a workpiece undergoing the processing executed by a given processing apparatus if the measuring unit of the given processing apparatus is not available for use, wherein said measurement value indicating the processing result is the measurement value that is measured by the measuring unit of another processing apparatus.

* * * * *